US012788007B2

(12) United States Patent
Keshavjee et al.

(10) Patent No.: US 12,788,007 B2
(45) Date of Patent: Nov. 10, 2026

(54) DONOR ORGAN PRESERVATION USING BOTH STATIC COLD STORAGE AND EX VIVO ORGAN PERFUSION

(71) Applicant: University Health Network, Toronto (CA)

(72) Inventors: Shafique Keshavjee, Toronto (CA); Thomas Kenneth Waddell, Toronto (CA); Aadil Ali, Brampton (CA); Marcelo Cypel, Toronto (CA)

(73) Assignee: University Health Network, Toronto (CA)

( * ) Notice: Subject to any disclaimer, the term of this patent is extended or adjusted under 35 U.S.C. 154(b) by 112 days.

(21) Appl. No.: 17/714,593

(22) Filed: Apr. 6, 2022

(65) Prior Publication Data

US 2022/0322658 A1 Oct. 13, 2022

Related U.S. Application Data

(60) Provisional application No. 63/171,858, filed on Apr. 7, 2021.

(51) Int. Cl.
*A01N 1/143* (2025.01)
*A01N 1/122* (2025.01)
*A01N 1/144* (2025.01)

(52) U.S. Cl.
CPC ............. *A01N 1/143* (2025.01); *A01N 1/122* (2025.01); *A01N 1/144* (2025.01)

(58) Field of Classification Search
CPC .... A01N 1/0247; A01N 1/0252; A01N 1/021; A01N 1/0284
See application file for complete search history.

(56) References Cited

U.S. PATENT DOCUMENTS 5,494,822 A * 2/1996 Sadri ........................ A01N 1/02 417/42
8,354,221 B2 1/2013 Roy et al.
D692,159 S 10/2013 Judson et al.
D692,160 S 10/2013 Judson et al.
D697,224 S 1/2014 Judson et al.
8,785,116 B2 7/2014 Anderson et al.
D713,972 S 9/2014 Judson et al.
D714,461 S 9/2014 Judson et al.
D714,462 S 9/2014 Judson et al.
8,828,710 B2 9/2014 Anderson et al.
8,835,158 B2 9/2014 Judson et al.
9,155,297 B2 10/2015 Anderson et al.
9,253,976 B2 2/2016 Anderson et al.
9,426,979 B2 8/2016 Anderson et al.
D765,874 S 9/2016 Judson et al.
9,560,846 B2 2/2017 Anderson et al.
D787,696 S 5/2017 Schmieta et al.
9,706,769 B2 7/2017 Taylor et al.
9,867,368 B2 1/2018 Anderson et al.
9,936,689 B2 4/2018 Anderson et al.
D819,223 S 5/2018 Judson et al.
11,089,775 B2 8/2021 Anderson et al.
11,166,452 B2 11/2021 Judson et al.
11,178,866 B2 11/2021 Anderson et al.
11,632,951 B2 4/2023 Collette et al.
11,856,944 B2 * 1/2024 Hassanein ............ A01N 1/0247
2005/0221269 A1 10/2005 Taylor et al.
2008/0145919 A1 6/2008 Franklin et al.
2009/0078699 A1 3/2009 Mustafa et al.
2009/0291486 A1 11/2009 Wenrich
2012/0330438 A1 * 12/2012 Keshavjee ............. A01N 1/122 623/23.65
2013/0177899 A1 7/2013 Taylor et al.
2019/0098892 A1 * 4/2019 Gil ......................... A01N 1/143
2019/0208768 A1 7/2019 Thatte et al.
2020/0138015 A1 * 5/2020 Bagnato ............... A01N 1/0294
2021/0337781 A1 11/2021 Judson et al.
2021/0337782 A1 * 11/2021 Freed ................... A01N 1/0247
2021/0392873 A1 12/2021 Anderson et al.
2021/0400952 A1 12/2021 Judson et al.
2021/0400953 A1 12/2021 Anderson et al.
2022/0000099 A1 1/2022 Collette et al.
2022/0007638 A1 1/2022 Judson et al.
(Continued)

FOREIGN PATENT DOCUMENTS

CA 2830225 A1 9/2012
CA 3066625 A1 12/2018
(Continued)

OTHER PUBLICATIONS

Hsin Mky et al. Extension of donor lung preservation with hypothermic storage after normothermic ex vivo lung perfusion. J Heart Lung Transplant. Jan. 2016;35(1):130-136. doi: 10.1016/j.healun.2015.05.017. Epub Jun. 10, 2015. PMID: 26227444. (Year: 2015).*
Cypel M et al. Normothermic ex vivo lung perfusion in clinical lung transplantation. N Engl J Med. Apr. 14, 2011;364(15):1431-40. doi: 10.1056/NEJMoa1014597. PMID: 21488765. (Year: 2011).*
Cypel M, Yeung JC, Hirayama S, Rubacha M, Fischer S, Anraku M, Sato M, Harwood S, Pierre A, Waddell TK, de Perrot M, Liu M, Keshavjee S. Technique for prolonged normothermic ex vivo lung perfusion. J Heart Lung Transplant. Dec. 2008;27(12):1319-25. doi: 10.1016/j.healun.2008.09.003. PMID: 19059112. (Year: 2008).*
Van Raemdonck D, Neyrinck A, Cypel M, Keshavjee S. Ex-vivo lung perfusion. Transpl Int. Jun. 2015;28(6):643-56. doi: 10.1111/tri.12317. Epub Apr. 28, 2014. PMID: 24629039. (Year: 2014).*
Wang et al. (J Thorac Cardiovasc Surg. Sep. 1989;98(3):333-42., see IDS) (Year: 1989).*
Date et al. (J Thorac Cardiovasc Surg. Apr. 1992;103(4):773-80. (Year: 1992).*
(Continued)

*Primary Examiner* — Fereydoun G Sajjadi
*Assistant Examiner* — Joel D Levin
(74) *Attorney, Agent, or Firm* — Morrison & Foerster LLP

(57) ABSTRACT

Methods, systems, and devices preserve donor organs by alternating between static cold storage and ex vivo organ perfusion. Preserving a donor organ includes refrigerating a donor organ to form a once-refrigerated donor organ, perfusing the once-refrigerated donor organ to form a once-perfused donor organ, and refrigerating the once-perfused donor organ to form a preserved, twice-refrigerated donor organ for transplantation.

21 Claims, 12 Drawing Sheets

(56) References Cited

U.S. PATENT DOCUMENTS

| | | | |
|---|---|---|---|
| 2022/0256838 A1 | 8/2022 | Anderson et al. |
| 2023/0148588 A1 | 5/2023 | Liu et al. |
| 2023/0284614 A1 | 9/2023 | Anderson et al. |
| 2023/0292742 A1 | 9/2023 | Anderson et al. |
| 2025/0089703 A1 | 3/2025 | Ali et al. |
| 2025/0160320 A1 | 5/2025 | Ali et al. |

FOREIGN PATENT DOCUMENTS

| | | | |
|---|---|---|---|
| CA | 3149024 | A1 | 3/2021 |
| CA | 3166611 | A1 | 8/2021 |
| EP | 2685814 | A2 | 1/2014 |
| EP | 2882660 | A1 | 6/2015 |
| EP | 2897459 | A2 | 7/2015 |
| EP | 3634127 | A1 | 4/2020 |
| EP | 3982725 | A1 | 4/2022 |
| EP | 4017262 | A1 | 6/2022 |
| EP | 4096399 | A1 | 12/2022 |
| NL | 1024022 | C2 | 4/2005 |
| WO | 2012/125782 | A2 | 9/2012 |
| WO | 2014/026119 | A1 | 2/2014 |
| WO | 2014/026128 | A2 | 2/2014 |
| WO | 2018/226993 | A1 | 12/2018 |
| WO | 2020/252148 | A1 | 12/2020 |
| WO | 2021/041181 | A1 | 3/2021 |
| WO | 2021/155147 | A1 | 8/2021 |
| WO | 2023/215611 | A1 | 11/2023 |

OTHER PUBLICATIONS

Date et al. (J Thorac Cardiovasc Surg. Mar. 1993;105(3):480-91. (Year: 1993).*

Kayano et al. (Circulation. Nov. 9, 1999;100(19 Suppl): II257-61. doi: 10.1161/01.cir.100.suppl_2.ii-257.) (Year: 1999).*

Cypel et al. (J Heart Lung Transplant. Dec. 2008;27(12):1319-25; of record IDS filed on Dec. 15, 2023, cite No. 6) (Year: 2008).*

Hsin et al. (J Heart Lung Transplant. Jan. 2016;35(1):130-136. Epub Jun. 1, 2015; of record IDS filed on Dec. 15, 2023) (Year: 2015).*

Campo-Cañaveral de la Cruz et al. (Arch Bronconeumol. May 2023;59(5):282-283. doi: 10.1016/j.arbres.2022.11.004. Epub Nov. 21, 2022 (Year: 2022).*

Ali et al (NEJM Evid. Jun. 2023;2(6):EVIDoa2300008. doi: 10.1056/EVIDoa2300008. Epub Apr. 20, 2023. (Year: 2023).*

Bhat et al. (Jul. 2021). "Normothermic Ex Situ Liver Perfusion Enhances Mitochondrial Function of DCD Grafts as Evidenced by High-throughput Metabolomics," Transplantation 105(7): 1530-1538.

Buchko et al. (2019). "Total parenteral nutrition in ex vivo lung perfusion: Addressing metabolism improves both inflammation and oxygenation," Am J Transplant 19: 3390-3397.

Burki et al. (2021). "Impact of triptolide during ex vivo lung perfusion on grafts after transplantation in a rat model," The Journal of Thoracic and Cardiovascular Surgery 161(1): e65-e74.

Wang et al. (Dec. 2018). "Irisin protects heart against ischemia-reperfusion injury through a SOD2-dependent mitochondria mechanism," J Cardiovasc Pharmacol 72(6): 259-269.

Christie et al. (Nov. 2010). "Construct validity of the definition of primary graft dysfunction after lung transplantation," The Journal of Heart and Lung Transplantation 29(11): 1231-1239.

Cypel et al. (Dec. 2008). "Technique for Prolonged Normothermic Ex Vivo Lung Perfusion," The Journal of Heart and Lung Transplantation 27(12): 1319-1325.

Cypel et al. (Jun. 2009). "Normothermic Ex Vivo Perfusion Prevents Lung Injury Compared to Extended Cold Preservation for Transplantation," American Journal of Transplantation 9(10): 2262-2269.

De Perrot et al. (2003). "Ischemia-Reperfusion-induced Lung Injury," American Journal of Respiratory and Critical Care Medicine 167(4): 490-511.

Divithotawela et al. (Dec. 2019). "Long-term Outcomes of Lung Transplant With Ex Vivo Lung Perfusion," JAMA Surgery 154(12): 1143-1150.

Extended European Search Report dated Oct. 24, 2022, directed to EP Application No. 22167019.3; 12 pages.

Fujinaga et al. (Nov. 2006). "Isoflurane Inhalation After Circulatory Arrest Protects Against Warm Ischemia Reperfusion Injury of the Lungs," Transplantation 82(9): 1168-1174.

Galasso et al. (Jan. 2019). "Inactivating hepatitis C virus in donor lungs using light therapies during normothermic ex vivo lung perfusion," Nature Communications 10: 1-12.

Hozain et al. (Apr. 2020). "Multiday maintenance of extracorporeal lungs using cross-circulation with conscious swine," The Journal of Thoracic and Cardiovascular Surgery 159(4): 1640-1653.

Hsin et al. (2016). "Extension of donor lung preservation with hypothermic storage after normothermic ex vivo lung perfusion," The Journal of Heart and Lung Transplantation 35(1): 130-136.

Koike et al. (Dec. 2011). "Kinetics of lactate metabolism during acellular normothermic ex vivo lung perfusion," The Journal of Heart and Lung Transplantation 30(12): 1312-1319.

Loor et al. (Oct. 2017). "Prolonged EVLP Using OCS Lung: Cellular and Acellular Perfusates," Transplantation 101 (10): 2303-2311.

Noda et al. (2014). "Successful prolonged ex vivo lung perfusion forgraft preservation in rats," European Journal of Cardio-Thoracic Surgery 45: e54-e60.

Senior. (Jun. 2018). "Beating the organ clock," Nature Biotechnology 36(6): 488-492.

Sig Uoft. (Nov. 26, 2020). "Transplant Surgery and Engineering Super-Organs—Dr. Shaf Keshavjee," located at https://www.youtube.com/watch?v=YxcgmKBrpUs; 2 pages.

Tikkanen et al. (Apr. 2015). "Functional outcomes and quality of life after normothermic ex vivo lung perfusion lung transplantation," The Journal of Heart and Lung Transplantation 34(4): 547-556.

Ueda et al. (1999). "Mitochondrial Injuries in Rat Lungs Preserved for 17 h: An Ultrastructural Study," European Surgical Research 31: 162-172.

Wei et al. (2020). "Ex vivo lung perfusion with perfusate purification for human donor lungs following prolonged cold storage," Ann Transl Med 8(3): 1-9.

Yeung et al. (Feb. 2017). "Outcomes after transplantation of lungs preserved for more than 12 h: a retrospective study," Lancet Respir Med 5:119-124.

Wang et al. (1989). "The effect of ischemic time and temperature on lung preservation in a simple ex vivo rabbit model used for functional assessment," The Journal of Thoracic and Cardiovascular Surgery 98(3): 333-342.

Ali et al., U.S. Office Action dated Aug. 13, 2025, directed to U.S. Appl. No. 19/030,621; 11 pages.

Date et al. (Apr. 1992). "In a canine model, lung preservation at 10° C. is superior to that at 4° C.," Journal of Thoracic and Cardiovascular Surgery 103(4):773-780.

Examination Report dated Jul. 2, 2025, directed to EP Application No. 22167019.3; 8 pages.

International Search Report and Written Opinion mailed Jan. 15, 2025, directed to International Application No. PCT/CA2024/051239; 10 pages.

* cited by examiner

DONOR ORGAN PRESERVATION USING BOTH STATIC COLD STORAGE AND EX VIVO ORGAN PERFUSION

CROSS REFERENCE TO RELATED APPLICATIONS

This application claims the priority of U.S. Provisional Application No. 63/171,858, filed Apr. 7, 2021, the entire contents of which is incorporated herein by reference.

FIELD

The present disclosure relates to donor organ preservation, and more particularly, to donor organ preservation using both static cold storage and ex vivo organ perfusion.

BACKGROUND

Preserving a donor organ ex vivo requires very careful handling to ensure that the donor organ remains viable for transplantation. Without proper handling, the donor organ can become damaged beyond repair, ruining the chances for that organ to potentially save a life. In particular, donor lungs can be especially challenging to preserve ex vivo. Currently, only about one in four donor lungs are suitable for transplant, and approximately one in five people waiting for a donor lung dies before they can receive a donor lung.

Conventional methods for donor organ preservation include removing the organ from the donor and placing it on ice. The donor organ remains on ice until it is ready to be transplanted into a recipient. Typically, the donor organ must be transplanted within 6-8 hours after being removed from the donor, or it risks suffering irreparable injury rendering it unfit for transplantation. In some cases, the donor organ may be treated with ex vivo organ perfusion (EVOP) prior to transplantation. EVOP mimics the human body environment by treating the donor organ with a perfusate comprising nutrients, proteins, and/or oxygen to flush out the donor organ. This process can be used to assess the viability of the donor organ and to recondition the donor organ prior to transplantation.

SUMMARY

Provided herein are methods, devices, and systems for extended donor organ preservation between removal and implantation. Specifically, the donor organ preservation methods, systems, and devices provided herein can combine static cold storage with ex vivo organ perfusion (EVOP) to preserve donor organs for longer periods of time than that which can be achieved using conventional preservation methods. The preservation techniques provided herein include alternating between static cold storage and EVOP to achieve longer preservation periods while ensuring the health and viability of the donor organ for transplantation.

Conventional donor organ preservation methods are limited in that they can only be used for a short period of time until the donor organ suffers irreparable injury and becomes unviable for successful transplantation. Additionally, these short preservation periods significantly limit organ transplantation options. For example, a short preservation period limits the number of suitable recipients which can receive the donor organ due to time and geographic constraints. A short preservation period also increases the chances of injury to the donor organ beyond repair if the donor organ is not able to be transplanted quickly enough.

However, preserving donor organs for longer periods of time using the methods provided herein can provide more transplantation options. More transplantation options can increase the number of successful organ transplantations. For example, an increased donor organ preservation period can allow the donor organ to travel further to its recipient. This can improve immunological matching between donor and recipients. A longer preservation period also allows practitioners more time to carefully prepare and plan for the transplantation.

Methods for donor organ preservation provided herein include alternating between static cold storage and ex vivo organ perfusion (EVOP) to achieve longer preservation periods. As explained above, preservation periods achieved using only static cold storage or only EVOP to preserve a donor organ are insufficient. For example, using static cold storage alone at temperatures of 8-12 °C can achieve preservation periods of approximately 36 hours without compromising the health of the donor organ. EVOP, when used as a preservation technique, can achieve preservation periods of 12-18 hours without compromising the health of the donor organ. However, it has been discovered that preservation techniques using both static cold storage and EVOP can achieve significantly longer preservation periods. Specifically, donor organ preservation techniques that alternate between static cold storage and EVOP can achieve preservation periods of greater than 36, 48, 60, or 72 hours.

In some embodiments, the periods of static cold storage may take place at relatively warmer temperatures than those used in conventional static cold storage. For example, the preservation techniques provided herein may include periods of static cold storage at temperatures of 8-12 °C. This is slightly warmer than the temperatures achieved using conventional static cold storage techniques. (Conventional static cold storage techniques often include placing the donor organ in a cooler on ice at 2-6 °C)

Systems for preserving a donor organ may be configured to implement the preservation methods described (i.e., alternating between static cold storage and EVOP). A system for preserving a donor organ can include a refrigeration unit and an EVOP unit. Such a system may require that the donor organ being preserved is manually transferred between the refrigeration unit and the EVOP unit throughout the duration of the preservation period. In some embodiments, the EVOP unit comprising a donor organ may be configured to be placed into the refrigeration unit during a static cold storage period of the alternating preservation method. For example, an EVOP unit may be placed directly into a refrigerator or a walk-in cooler.

Devices for preserving donor organs are also provided. Devices for preserving donor organs are configured to implement the preservation methods described (i.e., alternating between static cold storage and EVOP). Such a device may eliminate the need to physically and/or manually transfer the donor organ from a refrigeration unit to an EVOP unit as described above. In some embodiments, such a device may include a perfusate recirculation loop. In some embodiments, a donor organ preservation device may also include one or more of a pump for delivering perfusate to the donor organ, a ventilator for ventilating the donor organ, a refrigeration unit to refrigerate the donor organ, and/or various components for treating the perfusate of the recirculation loop after it exits the donor organ and before it reenters the donor organ.

As used herein, the terms “transplantation” and “transplant” may refer to the process of removing an organ from a donor and placing it into a recipient, or the terms “transplantation" and "transplant" may refer to only the process of placing a donor organ into a recipient. Additionally, the terms "transplantation," "transplant," "implantation," and/or "implant" may be used interchangeably to refer to the process of surgically placing a donor organ into a recipient.

In some embodiments, provided is a method of preserving a donor organ for transplantation, the method comprising: refrigerating a donor organ to form a once-refrigerated donor organ; perfusing the once-refrigerated donor organ to form a once-perfused donor organ; and refrigerating the once-perfused donor organ to form a preserved, twice-refrigerated donor organ for transplantation.

In some embodiments of the method, the method comprises perfusing the twice-refrigerated donor organ to form a preserved, twice-perfused donor organ for transplantation.

In some embodiments of the method, the method comprises refrigerating the twice-perfused donor organ to form a thrice-refrigerated donor organ for transplantation.

In some embodiments of the method, perfusing comprises pumping perfusate through the donor organ.

In some embodiments of the method, perfusing comprises ventilating the donor organ.

In some embodiments of the method, perfusing comprises normothermic perfusion.

In some embodiments of the method, perfusing comprises perfusing for less than 6 hours.

In some embodiments of the method, at least one of the refrigeration steps comprises refrigerating at a temperature of 8-12 °C.

In some embodiments of the method, at least one of the refrigeration steps comprises refrigerating at a temperature of 2-6 °C.

In some embodiments of the method, at least one of the refrigeration steps comprises refrigerating for less than 24 hours.

In some embodiments of the method, the perfusate is 8-12 °C.

In some embodiments of the method, the perfusate is 34-40 °C.

In some embodiments of the method, the method is configured to preserve the donor organ for at least 48 hours.

In some embodiments of the method, the donor organ is a lung.

In some embodiments, provided in a donor organ preservation device the donor organ preservation device comprising: a pump configured to deliver a perfusate to a donor organ; a refrigeration unit configured to refrigerate the donor organ; and a controller configured to control the pump and the refrigeration unit.

In some embodiments of the donor organ preservation device, the device comprises a ventilator configured to ventilate the donor organ.

In some embodiments of the donor organ preservation device, the controller is configured to control the ventilator.

In some embodiments of the donor organ preservation device, the device comprises a perfusate recirculation loop configured to recirculate the perfusate through the donor organ.

In some embodiments of the donor organ preservation device, the controller is configured to control the refrigeration unit to refrigerate the donor organ at 8-12 °C.

In some embodiments of the donor organ preservation device, the controller is configured to control the refrigeration unit to refrigerate the donor organ for less than 24 hours.

In some embodiments of the donor organ preservation device, the controller is configured to control the pump to deliver perfusate to the donor organ at a temperature of 34-40 °C.

In some embodiments of the donor organ preservation device, controller is configured to control the pump to deliver perfusate to the donor organ at a temperature of 8-12 °C.

In some embodiments of the donor organ preservation device, the controller is configured to control the pump to deliver perfusate to the donor organ for less than 6 hours.

In some embodiments of the donor organ preservation device, the controller is configured to control the ventilator to ventilate the donor organ at a temperature of 34-40 °C.

In some embodiments of the donor organ preservation device, the controller is configured to control the ventilator to ventilate the donor organ for less than 6 hours.

In some embodiments of the donor organ preservation device, the device comprises one or more of a filter, a membrane deoxygenator, or a cleaning device, wherein each of the one or more of the filter, the membrane deoxygenator, or the cleaning device is configured to treat the perfusate once the perfusate exits the donor organ.

In some embodiments of the donor organ preservation device, the filter is configured to remove leukocytes from the perfusate.

In some embodiments of the donor organ preservation device, the membrane deoxygenator is configured to remove oxygen from the perfusate.

In some embodiments of the donor organ preservation device, the cleaning device is configured to remove one or more of microorganisms, bacteria, or viruses from the perfusate.

In some embodiments of the donor organ preservation device, the cleaning device comprises an ultraviolet-C irradiation device.

In some embodiments of the donor organ preservation device, the perfusate comprises one or more of nutrients, proteins, or oxygen.

In some embodiments of the donor organ preservation device, the device is configured to preserve the donor organ for at least 48 hours.

In some embodiments of the donor organ preservation device, the donor organ is a lung.

BRIEF DESCRIPTION OF THE FIGURES

The invention will now be described, by way of example only, with reference to the accompanying drawings, in which.

DETAILED DESCRIPTION

Figure 1:
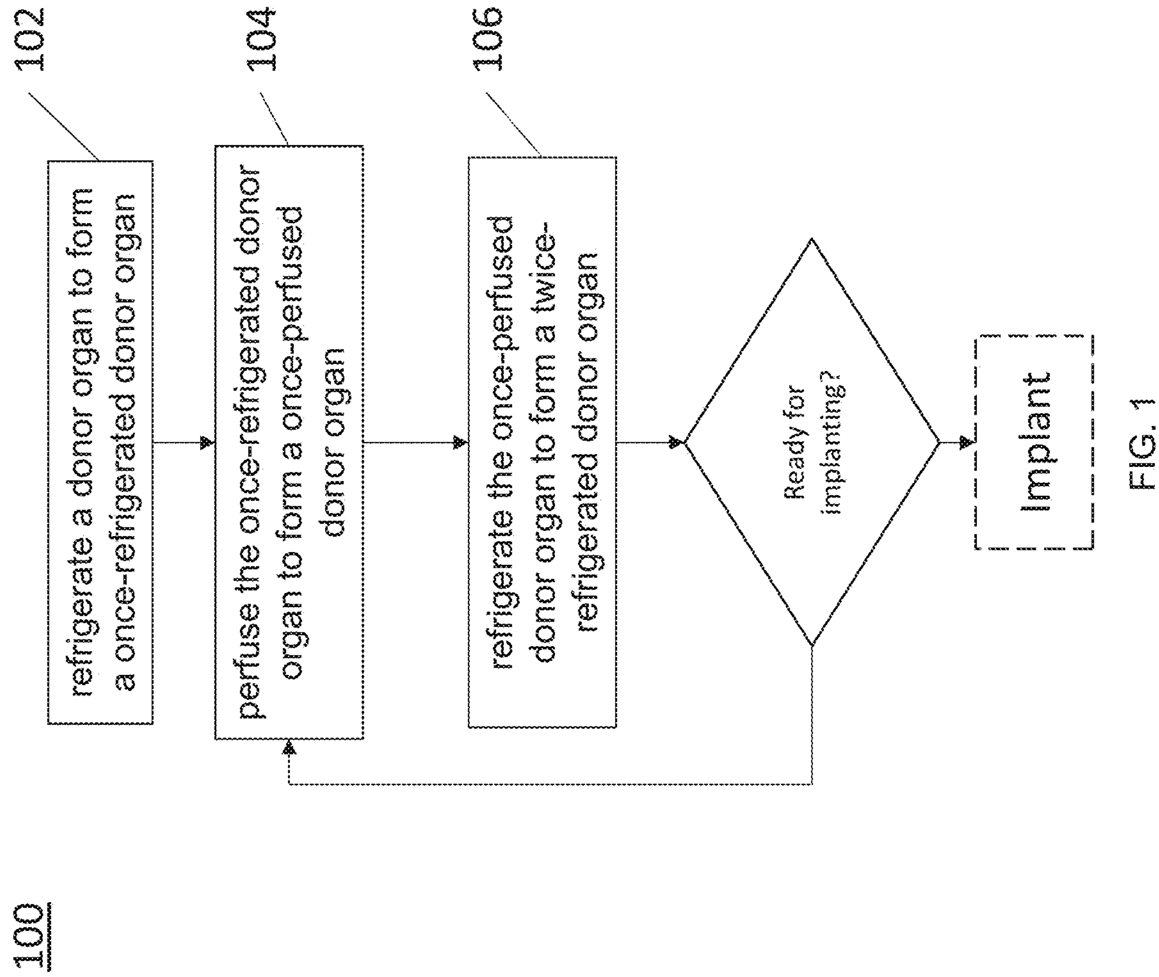
FIG. 1 illustrates a method for preserving a donor organ that includes alternating between static cold storage and ex vivo organ perfusion (EVOP), according to some embodiments.

Described herein are methods, systems, and devices that can preserve donor organs by alternating between static cold storage and ex vivo organ perfusion (EVOP). By alternating between static cold storage and EVOP, the methods, systems, and devices described can preserve donor organs for longer periods of time than that which can be achieved using conventional methods.

Relatively short preservation periods, such as those achieved using conventional preservation methods, can limit transplantation options and are more likely adversely affect the viability of the donor organ. For example, static cold storage is conventionally used for preserving donor organs. However, conventional static cold storage techniques, which often comprise placing the donor organ in a cooler on ice, can only preserve a donor organ for 6-8 hours at most. Another conventional technique, EVOP, is typically used as a method for assessing the viability of a donor organ after static cold storage and reconditioning the donor organ prior to transplantation. However, EVOP can sometimes be used as a donor organ preservation method, but it has only been shown to successfully preserve donor organs for approximately 12-18 hours.

Accordingly, the methods, systems, and devices described herein can preserve a donor organ for longer periods of time than that which can be achieved using conventional preservation methods. Specifically, it has been demonstrated that by alternating between static cold storage and EVOP techniques, a donor organ may be preserved for a period of time (e.g., 48-72 hours) that is greater than the preservation periods achievable using static cold storage or EVOP preservation alone. Donor organs cannot be preserves for longer periods using only static cold storage or EVOP because they would suffer irreparable damage and become unviable for transplantation. However, it has been shown that donor organs can be subjected to cycles of reduced metabolism (i.e., with static cold storage) and restored metabolism (i.e., with EVOP) to achieve a preservation period that is significantly longer than the preservation periods that can be achieved using only static cold storage or only EVOP. Notably, this combined static cold storage and EVOP preservation technique can maintain the health of the donor organ throughout the preservation period and does not decrease the likelihood of a successful organ transplantation outcome.

Additionally, the longer preservation periods provided by the combined static cold storage and EVOP preservation techniques described herein can help increase the number of successful organ transplantations and decrease the number of donor organs that are injured or otherwise deemed unviable for transplantation. For example, longer preservation periods may allow for improved immunological matching between donor and recipients, the opportunity to perform time-dependent therapies, improved transplant logistics, and the progression of lung transplantation towards a semi-elective procedure.

The combined static cold storage and EVOP techniques provided herein specifically include alternating between static cold storage and EVOP. For example, a preservation method may include first refrigerating a donor organ using static cold storage at 8-12 °C using static cold storage for 12-28 hours. In some embodiments, the refrigerated donor organ may then be perfused using EVOP for 2-8 hours at body temperature. In some embodiments, the perfused donor organ may again be refrigerated at 8-12 °C using static cold storage for 12-28 hours. This cycle can continue alternating between static cold storage (e.g., refrigeration at 8-12 °C) and EVOP for upwards of 36, 48, 60, or 72 hours and until the donor organ is ready for transplantation.

The methods, systems, and devices provided herein may be used to preserve any organ suitable for transplantation. Some examples described below use lungs as an example of an organ suitable for preservation using the methods, systems, and devices described herein. However, other suitable organs can include kidneys, livers, hearts, pancreas, intestines, hands, and/or faces.

Additionally, most embodiments of the methods, systems, and devices provided herein are described with respect to a single donor organ. However, the methods, systems, and devices described may be configured to preserve more than a single donor organ at a time. For example, the methods, systems, and devices may be capable of preserving a single donor organ (e.g., a single lung, a single kidney). In some embodiments, the methods, systems, and devices may be capable of preserving a pair of donor organs (e.g., a pair of lungs, a pair of kidneys). In some embodiments, the methods, systems, and devices may be capable of preserving 3, 4, 5, 6, 7, 8, 9, or 10 donor organs at the same time.

Provided below is (1) a brief overview of static cold storage; (2) a brief overview of EVOP; (3) methods that include combining static cold storage and EVOP to achieve longer donor organ preservation periods; (4) systems for preserving donor organs using combined static cold storage and EVOP methods; (5) devices for preserving donor organs using combined static cold storage and EVOP methods; (6) examples; and (7) testing methods. Also included in the brief overviews of static cold storage and EVOP are specific examples of static cold storage and EVOP as they apply to donor lung preservation. Lungs are just one example of a donor organ that may benefit from the techniques described herein.

Static Cold Storage

Static cold storage is currently the standard preservation technique for many donor organs. The goal of static cold storage is to sustain cellular viability by reducing cellular metabolism. Static cold storage can include storing the donor organ in a cooler on ice, and/or it can include refrigerating the donor organ using more controlled refrigeration methods. Often, the specific parameters at which static cold storage is applied is dependent upon the specific organ that is being preserved. Thus, the temperature at which the donor organ is stored, and the maximum time at which the donor organ is preserved, can vary.

Static cold storage has historically been used to preserve donor lungs. Specifically, donor lungs are typically preserved in a cooler on ice until they can be transplanted into a recipient. A cooler with ice typically stores the donor lung at temperatures of 2-6 °C. However, not only does this technique only allow the donor lung to be preserved for short periods (i.e., 6-8 hours), but it also reduces the viability of the donor lung by damaging the lung's mitochondrial health. This is problematic because mitochondrial health of a donor lung has been shown to have a direct effect on the success rate of the lung transplantation. Thus, a lung having a compromised mitochondrial health is more likely to also have a compromised transplantation outcome.

However, it has been shown that preserving donor lungs using static cold storage at slightly higher temperatures (i.e., 8-12 °C) can achieve preservation periods of up to 36 hours while still achieving successful transplantation outcomes. This technique maintains the mitochondrial health of the donor lung better than that of static cold storage at the lower temperatures (i.e., 2-6 °C) described above. For example, it has been shown that the levels of the mitochondrial-related metabolites itaconate, glutamate, and N-acetylglutamine are greater in donor lungs that have been preserved at 36 hours and 10 °C than in donor lungs that have been preserved at 6-8 hours and 4 °C. The higher levels of these mitochondrial-related metabolites after preservation indicate that donor lungs preserved using static cold storage for 36 hours at 10 °C have improved mitochondrial health than the donor lungs preserved at 6-8 hours and 4 °C. Accordingly, these static cold storage preservation techniques at higher temperatures (i.e., 8-12 °C) are able to achieve longer preservation periods while better maintaining the mitochondrial health of donor lungs.

In some embodiments, successful transplantation of a donor lung preserved using static cold storage at these slightly higher temperatures may rely on treating the donor lung with ex vivo lung perfusion (EVLP) to recondition the donor lung and prepare it for transplantation.

Ex Vivo Organ Perfusion

Ex vivo organ perfusion (EVOP) is a process that is typically used for assessing the health of a donor organ after static cold storage and reconditioning the donor organ just prior to transplantation. Specifically, normothermic EVOP is a method of EVOP that simulates an in vivo environment prior to transplantation by bringing the donor organ back to body temperature, re-oxygenating the donor organ, and restoring the metabolism of the donor organ. Treating a donor organ that has been preserved with static cold storage with EVOP prior to transplantation can increase the chances of a successful transplantation outcome.

EVOP includes pumping a solution (or "perfusate") through the donor organ. The perfusate comprises nutrients, proteins, and/or oxygen, and its composition is specific to the type of organ being treated. The donor organ can also be ventilated while the perfusate circulates through the donor organ. Often, the donor organ is treated with EVOP while being maintained at body temperature in a sealed chamber. The combination of the perfusate passing through the donor organ along with ventilation of the donor organ can reverse injury to the donor organ (particularly injuries sustained during preservation) and can remove excess fluid in the donor organ.

Ex vivo lung perfusion (EVLP) is a specific type of EVOP that is applied specifically to lungs. EVLP mimics the environment of the lungs inside the body. Specifically, the donor lung(s) are placed inside an enclosed clear, plastic chamber and attached to a filtration and ventilation system. During treatment and while the donor lung(s) are inside the chamber, they are kept at a steady temperature (e.g., body temperature) and treated with a perfusate specifically formulated for lungs. Flushing the perfusate through the donor lung(s) removes bacteria and excess fluid and promotes the overall health and stability of the donor lung(s). EVLP is discussed in more detail below with respect to FIG. 3.

As used herein, "EVOP" means normothermic EVOP unless indicated otherwise.

Preservation Methods that Include Alternating Between Static Cold Storage and Ex Vivo Organ Perfusion (Evop)

As explained immediately above, static cold storage at 10 °C can only preserve a donor organ for 36 hours, and EVOP can only preserve a donor organ for 12-18 hours. However, it has been determined that preserving donor organs using techniques that alternate between static cold storage and EVOP can achieve longer preservation periods. In particular, combining periods of static cold storage at relative higher temperatures (i.e., 8-12 °C) with periods of EVOP can achieve longer preservation times without compromising the likelihood of a successful transplantation outcome. These longer preservation periods can also allow more flexibility with donor organ transplantation (e.g., improved logistics, better immunological match between donor and recipient, increased transportation distances, etc.).

Preservation methods according to some embodiments provided can include multiple physical locations. For example, a practitioner may procure a donor organ from a donor at a first location and place the donor organ into a temporary refrigeration unit (e.g., a cooler with ice, a transportable refrigeration unit). The temporary refrigeration unit may be transported to an entity at a second location for controlled preservation. The second location may be located within the same building (e.g., hospital, transplant center) as the first location, or the second location may be located elsewhere. For example, the donor organ in the temporary refrigeration unit may be transported to a second location (e.g., hospital, transplant center, preservation center) that is located in a different building, at a different address, and/or in a different town/city than the first location at which the organ was procured. In some embodiments, the donor organ may be transplanted into a recipient at the second location. In some embodiments, the donor organ may be transported via the temporary refrigeration unit for transplantation. For example, the donor organ may be transported back to the first location for transplantation, or the donor organ may be transported to a third location for transplantation.

In some embodiments, preservation methods can include a single physical location. For example, donor organ procurement, preservation, and transplantation may all occur within the same room, within the same wing/suite, and/or within the sample building. This may eliminate the need for a temporary refrigeration unit described above. Instead, the donor organ may be placed immediately into a controlled refrigeration unit configured for longer-term preservation than that of the temporary refrigeration unit described previously. The controlled refrigeration unit may be configured to perform the refrigeration steps of preservation methods described (e.g., the refrigeration steps of method 100, described immediately below.)

In the following description, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general-purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein. As used herein, the term "controller" refers to an electronic computing device configured and/or programmed to perform control functions for controlling connected devices according to the principles described herein. A controller can be or include any of the computing technology and architectures described above in any combination.

FIG. 1 shows preservation method 100 according to some embodiments. As shown, preservation methods according to FIG. 1 can include a series of refrigeration and perfusion steps. Specifically, method 100 of FIG. 1 includes an initial refrigeration period at step 102, a first perfusion period at step 104, a second refrigeration period at step 106, a second perfusion period at step 108, and a third refrigeration period at step 110. Each refrigeration period and each perfusion period is described in detail below. As used herein, "refrigeration" and "static cold storage" are used interchangeably, and "EVOP" and "perfusion" are used interchangeably.

At step 102, a donor organ is refrigerated to form a once-refrigerated donor organ. This initial (i.e., first) refrigeration period can include refrigerating the donor organ immediately upon receiving a donor organ directly from the donor. In some embodiments, this initial refrigeration period may include placing the donor organ on a cooler of ice. In some embodiments, this initial refrigeration period can include placing the donor organ in a controlled refrigeration device configured to hold the donor organ at a controlled temperature (e.g., a refrigerator, a walk-in cooler). In some embodiments, the initial refrigeration period can include both placing the donor organ in a cooler on ice and also placing the donor organ in a controlled refrigeration device.

In some embodiments, the initial refrigeration period may include placing the donor organ on ice for a period of time until the donor organ is transferred to a controlled refrigeration device. However, as explained above, a cooler with ice refrigerates the donor organ at relatively low temperatures (i.e., 2-6 °C). In some embodiments, these lower temperatures can cause injury to the donor organ sooner than warmer temperatures (i.e., 8-12 °C). Accordingly, this period of refrigeration on ice is preferably as short as possible. In some embodiments, the initial refrigeration period may include placing the donor organ in a cooler on ice for about 0.1-8 hours, about 0.5-6 hours, or about 2-4 hours. In some embodiments, the initial refrigeration period may include placing the donor organ in a cooler on ice for greater than or equal to about 0.1, about 0.5, about 1, about 2, about 3, about 4, about 5, about 6, or about 7 hours. In some embodiments, the initial refrigeration period may include placing the donor organ in a cooler on ice for less than or equal to about 8, about 7, about 6, about 5, about 4, about 3, about 2, about 1, or about 0.5 hours. In some embodiments, the initial refrigeration period may include placing the donor organ in a cooler on ice at a temperature of about 0-6 °C, about 2-6 °C, or about 3-5 °C. In some embodiments, the initial refrigeration period may include placing the donor organ in a cooler on ice at a temperature of greater than or equal to about 0, about 1, about 2, about 3, about 4, or about 5 °C. In some embodiments, the initial refrigeration period may include placing the donor organ in a cooler on ice at a temperature of less than or equal to about 5, about 4, about 3, about 2, or about 1 °C. If the donor organ is stored at these conditions (i.e., in a cooler on ice at relatively cool temperatures) for too long, the donor organ may suffer irreparable damage and be unsuitable for transplantation. In some embodiments, the initial refrigeration period may not include storing the donor organ in a cooler on ice at all. Instead, the donor organ may be placed directly into a controlled refrigeration device immediately at procurement.

In some embodiments, the initial refrigeration period may include using static cold storage at slightly warmer temperatures than those of the optional cooler on ice, described above. To achieve these slightly warmer refrigeration temperatures (i.e., 8-12 °C), the donor organ may be placed within a controlled refrigeration device. As explained above, donor organs can be safely preserved for longer periods of time when refrigerated at temperatures of 8-12 °C instead of the temperatures of 2-6 °C achieved using ice. In some embodiments, the initial refrigeration period may include refrigerating the donor organ for about 12-24 hours, about 14-22 hours, or about 16-20 hours. In some embodiments, the initial refrigeration period may include refrigerating the donor organ for greater than or equal to about 12, about 14, about 16, about 18, about 20, or about 22 hours. In some embodiments, the initial refrigeration period may include refrigerating the donor organ for less than or equal to about 24, about 22, about 20, about 18, about 16, or about 14 hours. In some embodiments, the initial refrigeration period may include refrigerating the donor organ at a temperature of about 8-12 °C or about 9-11 °C. In some embodiments, the initial refrigeration period may include refrigerating the donor organ at a temperature of greater than or equal to about 8, about 9, about 10, or about 11 °C. In some embodiments, the initial refrigeration period may include refrigerating the donor organ at a temperature of less than or equal to about 12, about 11, about 10, or about 9 °C.

In some embodiments, the total initial refrigeration period (including both the controlled refrigeration period at a relatively higher temperature and the cooler on ice refrigeration period at a relatively lower temperature, if applicable) is about 14-32, about 16-20, or about 22-26 hours long. In some embodiments, the total initial refrigeration period is greater than or equal to about 14, about 16, about 18, about 20, about 22, about 24, about 26, about 28, or about 30 hours long. In some embodiments, the total initial refrigeration period is less than or equal to about 32, about 30, about 28, about 26, about 24, about 22, about 20, about 18, or about 16 hours long.

At step 104, after the initial refrigeration period, the once-refrigerated donor organ is perfused with a first cycle of perfusion to form a once-perfused donor organ. In some embodiments, the donor organ may be treated with a first perfusion cycle for about 2-6 to about 3-5 hours. In some embodiments, the donor organ may be treated with a first perfusion cycle for greater than or equal to about 2, about 3, about 4, or about 5 hours. In some embodiments, the donor organ may be treated with a first perfusion cycle for less than or equal to about 6, about 5, about 4, or about 3 hours. In some embodiments, the donor organ may be treated with a first perfusion cycle at a temperature of about 34-40 °C or about 36-38 °C. In some embodiments, the donor organ may be treated with a first perfusion cycle at a temperature of greater than or equal to about 34, about 35, about 36, about 37, about 38, or about 39 °C. In some embodiments, the donor organ may be treated with a first perfusion cycle at a temperature of less than or equal to about 40, about 39, about 38, about 37, about 36, or about 35 °C. In some embodiments, the donor organ may be treated with a first perfusion cycle at a temperature of about body temperature. If the donor organ is treated with perfusion too long, it can suffer irreparable damage and be unsuitable for transplantation. Additionally, if the donor organ is treated with perfusion at temperatures that are too high, it can suffer irreparable damage and be unsuitable for transplantation.

Alternatively, in some embodiments, the donor organ may be treated with a first perfusion cycle at a refrigeration temperature. For example, the donor organ may be treated with a first EVOP cycle at a temperature of about 8-12 °C or about 9-11 °C. In some embodiments, the donor organ may be treated with a first perfusion cycle at a temperature of greater than or equal to about 8, about 9, about 10, or about 11 °C. In some embodiments, the donor organ may be treated with a first perfusion cycle at a temperature of less than or equal to about 12, about 11, about 10, or about 9 °C.

At step 106, after the first cycle of perfusion, the once-perfused donor organ is again treated with static cold storage (i.e., refrigeration) to form a twice-refrigerated donor organ. In some embodiments, this second refrigeration period may include refrigerating the donor organ for about 14-26 hours, about 16-24 hours, or about 18-22 hours. In some embodiments, the second refrigeration period may include refrigerating the donor organ for greater than or equal to about 14, about 16, about 18, about 20, about 22, or about 24 hours. In some embodiments, the second refrigeration period may include refrigerating the donor organ for less than or equal to about 26, about 24, about 22, about 20, about 18, or about 16 hours. In some embodiments, the second refrigeration period may include refrigerating the donor organ at a temperature of about 8-12 °C or about 9-11 °C. In some embodiments, the second refrigeration period may include refrigerating the donor organ at a temperature of greater than or equal to about 8, about 9, about 10, or about 11 °C. In some embodiments, the second refrigeration period may include refrigerating the donor organ at a temperature of less than or equal to about 12, about 11, about 10, or about 9 °C.

If the donor organ is refrigerated for too long or at temperatures that are too low or too high, it may suffer irreparable damage and be unsuitable for transplantation.

After the donor organ has been refrigerated for a second time, the twice-refrigerated donor organ may either be implanted into a recipient or subjected to another perfusion step (e.g., step 104). The decision of whether to continue preserving the donor organ (i.e., by treating the donor organ with an additional perfusion step) or to implant the donor organ into a recipient may depend on different factors. For example, the decision may depend on whether the recipient is prepared for (or will soon be prepared for) implantation. The decision may depend on whether the practitioner/transplant team is prepared for implantation. In some embodiments, the decision may depend on the physical location of the donor organ. For example, if the donor organ is in the middle of being transported to a hospital, transplant center, etc., the preservation method should continue (i.e., by treating the donor organ with another perfusion step). If it is determined that it is time (or almost time) for the donor organ to be implanted, the preservation method can be ended. In some embodiments, the donor organ may be placed in a cooler on ice to be transported to the room, wing/suite, building, etc. for implantation. If the preservation method is ended after a perfusion period, it may be implanted immediately into a recipient or transported to the recipient's location in a cooler on ice to be implanted.

The preservation method may continue being preserved according to the alternating process depicted in method 100 ad infinitum. The alternating preservation process may continue until the recipient, the practitioner/transplant team, and the donor organ are all ready for implantation. Accordingly, donor organ preservation methods may include additional refrigeration cycles (i.e., static cold storage cycles) than the two refrigeration periods. In some embodiments, donor organ preservation methods may include more than the one perfusion cycle. Regardless of the exact number of refrigeration and perfusion cycles, the donor organ preservation methods provided alternate the two techniques (i.e., static cold storage/refrigeration and perfusion) until the desired total preservation time is achieved. In some embodiments, each refrigeration cycle is longer than each perfusion cycle. In some embodiments, the first perfusion and the second perfusion cycles are identical in time and temperature. In some embodiments, the first perfusion cycle may be longer or shorter than the second perfusion cycle. In some embodiments, the first perfusion cycle and the second perfusion cycle may occur at different temperatures. In some embodiments, the initial (i.e., first), second, and third refrigeration periods are all identical in time and temperature. In some embodiments, only the second and third refrigeration periods are identical in time and temperature. In some embodiments, the first, second, and/or third refrigeration periods are different in time and/or temperature.

In some embodiments, the total donor organ preservation period (i.e., the sum of all refrigeration periods and all perfusion cycles) is about 24-168 or about 48-120 hours. In some embodiments, the total donor organ preservation period (i.e., the sum of all refrigeration periods and all perfusion cycles) is greater than or equal to about 24, about 36, about 48, about 60, about 72, about 84, about 96, about 108, about 120, about 132, about 144, or about 156 hours. In some embodiments, the total donor organ preservation period (i.e., the sum of all refrigeration periods and all perfusion cycles) is less than or equal to about 168, about 156, about 144, about 132, about 120, about 108, about 96, about 84, about 72, about 60, about 48, or about 36 hours.

Donor Organ Preservation Systems for Both Static Cold Storage and Ex Vivo Organ Perfusion (Evop)

Systems for preserving donor organs can be used to treat the donor organ with both static cold storage and EVOP. For example, systems described below may be configured to implement the preservation methods described herein (i.e., alternating between static cold storage and perfusion). In some embodiments, the systems described below may be configured to preserve a donor organ using static cold storage at relatively higher temperatures (i.e., 8-12 °C) and/or relatively lower temperature (2-6 °C). Systems for donor organ preservation according to some embodiments are described in view of FIGS. 2 and 3 below.

Figure 2:
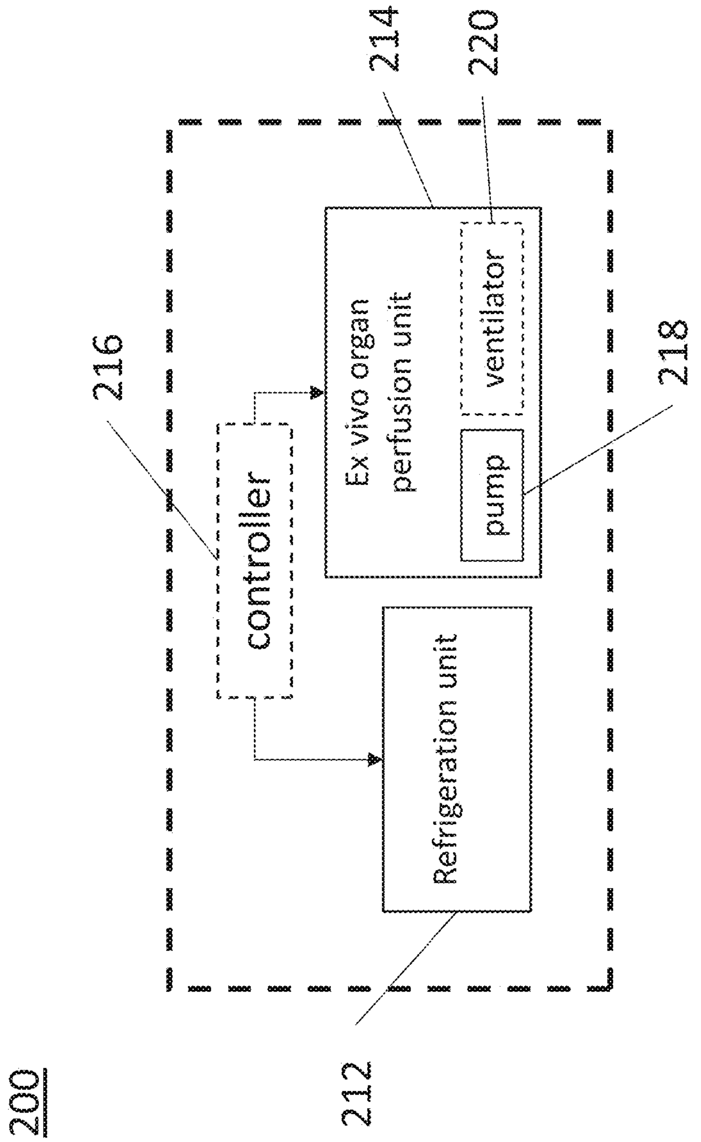
FIG. 2 illustrates a system for preserving a donor organ using static cold storage and EVOP, according to some embodiments.

FIG. 2 provides a high-level depiction of system 200 configured to treat a donor organ with both static cold storage and EVOP. As shown, system 200 comprises both a refrigeration unit 212 and an EVOP unit 214, as well as a controller 216. EVOP unit 214 comprises pump 218 and optionally ventilator 220.

In some embodiments, refrigeration unit 212 and EVOP unit 214 may be separate and independent units. For example, the donor organ being preserved by system 200 may need to be physically and/or manually removed from refrigeration unit 212 and placed into EVOP unit 214 when the preservation method being implemented by system 200 switches from static cold storage to EVOP. Similarly, the donor organ may need to be physically and/or manually removed from EVOP unit 214 and placed into refrigeration unit 212 when the preservation method being implemented by system 200 switches from EVOP to static cold storage. In some embodiments, during a refrigeration cycle, the donor organ being preserved may remain in EVOP unit 214. For example, at the conclusion of an EVOP cycle, the donor organ (e.g., donor lung(s)) may remain within EVOP unit 214 and EVOP unit 214 comprising the donor organ may be placed directly into a refrigeration unit 212.

In some embodiments, refrigeration unit 212 may comprise a cooler on ice. In some embodiments, refrigeration unit 212 may comprise a refrigerator configured to maintain the donor organ at a set temperature (e.g. between 8 and 12 °C). In some embodiments, refrigeration unit 212 may comprise an electric refrigerator. In some embodiments, refrigeration unit 212 may comprise a walk-in cooler. In some embodiments, refrigeration unit 212 may be configured to cool/refrigerate perfusate that is pumped through the donor organ.

In some embodiments, EVOP unit 214 may comprise a filter, a pump 218, and a cooler/heater. In some embodiments, EVOP unit 214 comprises a perfusate recirculation loop. The filter may be configured to remove contaminants from the perfusate that has been passed through the donor organ and before it reenters the donor organ. The pump 218 may be configured to deliver perfusate to the donor organ. The cooler/heater may be configured to warm or cool the perfusate. For example, the cooler/heater may be configured to warm the perfusate to body temperature or cool the perfusate to a refrigeration temperature.

EVOP unit 214 may further comprise a ventilator 220, membrane deoxygenator, a cleaning mechanism, and a chamber. The ventilator 220 may be configured to ventilate the donor organ. The membrane deoxygenator may be configured to remove oxygen from the perfusate once it exits the donor organ and before it reenters the donor organ (e.g., in embodiments comprising a perfusate recirculation loop). The cleaning mechanism may be configured to clean the perfusate after it exits the donor organ. For example, the cleaning mechanism may remove microorganisms, bacteria, and/or viruses from the perfusate. In some embodiments, the cleaning mechanism uses ultraviolet light to clean the perfusate.

In some embodiments, EVOP unit 214 may be configured to perform EVLP on one or more donor lungs. In this case, EVOP unit 214 may comprise one of the Toronto system, the Lund system, or the Organ Care System. The Toronto system is the most widely used EVLP system and may be suitable for the preservation systems described herein.

Controller 216 may be configured to control refrigeration unit 212 and/or EVOP unit 214. For example, controller 216 may be configured to control the temperature at which the refrigeration unit 212 refrigerates the donor organ. In some embodiments, controller 216 may be configured to control the length of time at which refrigeration unit 212 refrigerates the donor organ. Controller 216 may also be configured to control the temperature at which EVOP unit 214 perfusates the donor organ. In some embodiments, controller 216 may be configured to control the length of time at which EVOP unit 214 perfusates the donor organ. In some embodiments, controller 216 may also be configured to control a filter, a pump 218, a cooler/heater, a ventilator 220, a membrane deoxygenator, a cleaning mechanism, and/or a chamber of EVOP unit 214.

Figure 3:
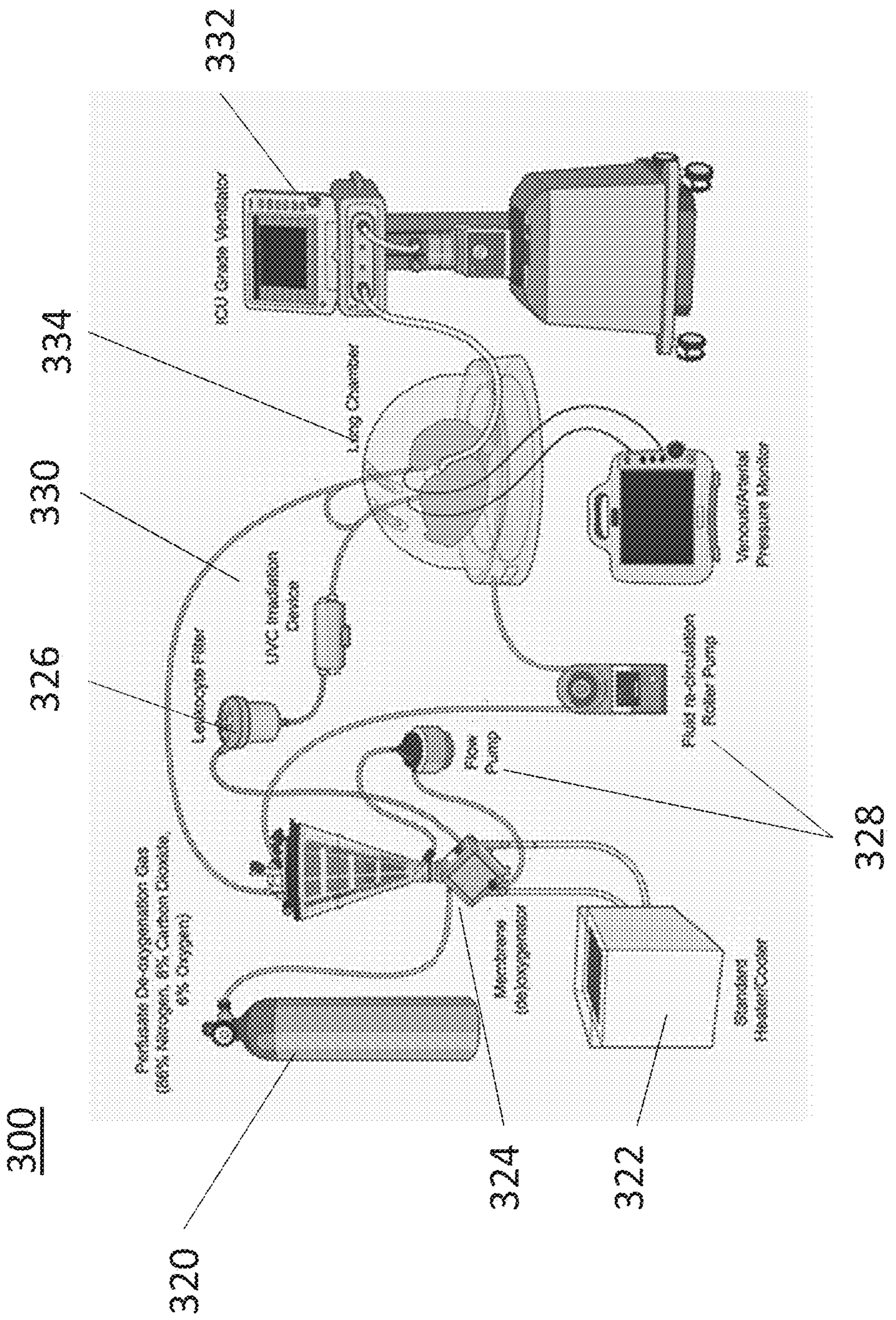
FIG. 3 illustrates a system for performing ex vivo lung perfusion (EVLP) on a donor lung, according to some embodiments.

FIG. 3 provides a depiction of an EVLP system 300. As shown, system 300 can include perfusate source 320, a heater/cooler 322, a membrane deoxygenator 324, a filter 326, one or more pumps 328, a cleaning device 330, ventilator 332, and a chamber 334. Examples of each of these components are described in detail below.

Perfusate source 320 may store perfusate and/or deliver perfusate to one or more donor lungs held in chamber 334. The perfusate of perfusate source 320 may be cellular or acellular. In some embodiments, the perfusate may comprise nutrients, proteins, and/or oxygen. One suitable perfusate for EVLP is acellular Steen Solution™. Steen Solution™ is a clear, sterile, non-toxic salt solution that comprises human serum albumin (HSA) and dextran 40. The Steen Solution™ may be combined with red blood cells. System 300 may be configured to circulate perfusate through the donor lung(s) on a recirculation loop. Thus, the perfusate may pass through the donor lung(s) numerous times. Perfusate that is recirculated through the donor organ may need to be replaced periodically. For example, the perfusate may need to be replaced after a certain number of passes or after it has been recirculating for a specific amount of time.

Heater/cooler 322 is configured to warm or cool one or more components of system 300. For example, heater/cooler 322 may be used to warm or cool the perfusate to a set temperature. In some embodiments, heater/cooler 332 may be configured to warm or cool an interior of chamber 334. In some embodiments, heater/cooler 322 may be configured to warm the perfusate and/or an interior of chamber 334 to approximately body temperature (i.e., 34-40 °C). In some embodiments, heater/cooler 322 may be configured to cool the perfusate and/or an interior of chamber 334 to a refrigeration temperature (e.g., 8-12 °C).

Membrane (de)oxygenator 324 is used to simulate oxygen consumption in the body via deoxygenation. Thus, membrane (de)oxygenator 324 is configured to remove oxygen from the perfusate. In some embodiments, membrane (de) oxygenator 324 may be configured to oxygenate the perfusate. Membrane (de)oxygenator 324 may be configured to treat perfusate that has exited the donor lung(s) and before it reenters the donor lung(s). Accordingly, membrane (de) oxygenator 324 may be configured to treat perfusate on a recirculation loop.

Filter 326 is configured to remove one or more contaminants from the perfusate. For example, the purpose of the perfusate is to flush the donor lung(s). Thus, filter 326 may filter out the contaminants acquired by the perfusate as it flushed through the donor lung(s). Filtration by filter 326 can allow the perfusate to recirculate through the donor lung(s) a number of times on a recirculation loop. In some embodiments, filter 326 is a leukocyte filter. A leukocyte filter is configured to separate leukocytes (i.e., white blood cells) from perfusate that has passed through the donor lung(s).

One or more pumps 328 are configured to pump perfusate between two or more components in system 300. For example, a first pump 328 may be configured to pump perfusate from perfusate source 320 and/or to the donor lung(s). A second pump 328 may be configured to pump perfusate from the donor lung to membrane (de)oxygenator 324, leukocyte filter 326, and/or cleaning device 330 to be treated prior to reentering the donor lung(s).

Cleaning device 330 is configured to disinfect one or more components of system 300. For example, cleaning device 330 may be configured to clean perfusate that has flushed through a donor lung(s). In some embodiments, cleaning device 330 may be configured to run continuously during perfusion to prevent potential microbial contamination. In some embodiments, cleaning device 330 is an ultraviolet-C irradiation device. In some embodiments, cleaning device 330 may be configured to kill microorganisms, bacteria, and/or viruses. In some embodiments, cleaning device 330 may be configured to kill the hepatitis C virus.

Ventilator 332 is configured to pump one or more gases into the donor lung. Ventilator 332 can connect to a trachea attached to the donor lung(s) to pump gases into the donor lung(s). In some embodiments, ventilator 332 may be configured to ventilate the donor lung(s) using volume-controlled ventilation. In some embodiments, ventilator 332 may only be configured to operate at temperature at or near body temperature (i.e., 34-40 °C). In some embodiments, ventilator 332 is not configured to operate at refrigeration temperatures.

Chamber 334 may comprise a clear, plastic dome configured to hold the donor lung(s) during the EVLP process and to protect the donor lung(s) from contamination. Because chamber 334 is clear, it can allow a user or an operator to observe the donor lung(s) during EVLP.

Donor Organ Preservation Devices for Both Static Cold Storage and Ex Vivo Organ Perfusion (Evop)

Devices for preserving a donor organ may include both an EVOP unit and a refrigeration unit. Specifically, preservation devices described below may be able to alternate between static cold storage and EVOP without removing the donor organ from the device. In some embodiments, the preservation devices are configured to preserve a donor organ according to methods described previously (e.g., method 100 of FIG. 1).

Devices that are configured to both refrigerate and perfuse a donor organ can allow the donor organ to travel a greater length of time and/or a greater distance to reach its recipient. The donor organ can be placed into the device as soon as it is procured, and it only needs to be removed from the device when it is ready to be transplanted. In some embodiments, preservation devices may even be transportable. Transportable preservation devices eliminate the need to place the donor organ in a cooler on ice immediately upon procurement, since the preservation device can be brought directly to the donor to receive the donor organ. By eliminating the need to place the donor organ on ice, the health of the donor organ is better maintained (since it has been shown that the 2-6 °C temperatures achieved by placing the donor organ in a cooler on ice are more detrimental to the health of the donor organ than slightly warmer temperatures of 8-12 °C that can be achieved using a controlled refrigerator.) Transportable preservation devices also allow for easier transportation of the donor organ during the preservation period.

The devices described also minimize the planning and logistics required to successfully preserve the donor organ. For example, the donor organ does not need to be physically and/or manually transferred between an EVOP unit and a refrigeration unit throughout the duration of its preservation period. Preservation devices can also eliminate the need to transfer the EVOP unit into and out of the refrigeration unit (i.e., as necessary in a system that allows the EVOP unit comprising the donor organ to be placed directly into refrigeration unit).

In some embodiments, preservation devices that are configured to both refrigerate and perfuse a donor organ can include a refrigeration unit, a pump, a ventilator, and a controller. The pump and ventilator may be configured to treat the donor organ with EVOP. The controller may be configured to control both the refrigeration unit and the EVOP unit (i.e., pump and ventilator). In some embodiments, system 200 of FIG. 2, described above, may be a device. As shown in FIG. 2, system 200 is a device that comprises a refrigeration unit 212, an EVOP unit 214, and a controller 216. EVOP unit 214 includes pump 218 and optionally, ventilator 220.

Refrigeration unit 212 of a preservation device can be configured to cool the donor organ to a set temperature. For example, the refrigeration unit 212 may be configured to cool the donor organ to a temperature of about 8-12 °C or about 9-11 °C. In some embodiments, the refrigeration unit 212 may be configured to cool the donor organ to a temperature of greater than or equal to about 8, about 9, about 10, or about 11 °C. In some embodiments, the refrigeration unit 212 may be configured to cool the donor organ to a temperature of less than or equal to about 12, about 11, about 10, or about 9 °C.

The pump 218 of EVOP unit 214 can be configured to deliver perfusate from a perfusate source to the donor organ. In some embodiments, a pump 218 may be configured to recirculate perfusate through a recirculation loop. For example, perfusate that has passed through the donor organ and exited the donor organ may be pumped back into the donor organ. In some embodiments, a preservation device may include two or more pumps 218 to mobilize the perfusate through the device.

EVOP unit 214 of the device may comprise ventilator 220. Ventilator 220 may be configured to ventilate the donor organ. In some embodiments, a ventilator 220 may be configured to continuously ventilate the organ throughout the entire preservation period. In some embodiments, the ventilator 220 may be configured to apply volume-controlled ventilation. In some embodiments, the ventilator 220 may be configured to ventilate the donor organ only during EVOP cycles.

The perfusate used to perfuse the donor organ may be cellular or acellular. In some embodiments, the perfusate may comprise nutrients, proteins, and/or oxygen. In some embodiments, a preservation device can include a perfusate recirculation loop. In some embodiments, a preservation device may include a single-pass perfusate system.

In some embodiments, preservation devices that are configured to both refrigerate and perfuse a donor organ can further include a heater/cooler, a filter, a membrane deoxygenator, and/or a cleaning device. In particular, these components may be included in a preservation device having a perfusate recirculation loop to treat the perfusate before it reenters the donor organ.

A heater/cooler may be configured to heat or cool one or more components of the preservation device. For example, the heater/cooler may be configured to heat or cool an interior space of the device (i.e., where the donor organ is held). For example, an interior space of the device may be heated by the heater/cooler to approximately body temperature (i.e., 34-40 °C). In some embodiments, an interior space of the device may be cooled by the heater/cooler to a refrigeration temperature (i.e., 8-12 °C). In some embodiments, the heater/cooler may be configured to heat or cool the perfusate. For example, the perfusate may be heated to approximately body temperature (i.e., 34-40 °C) prior to passing through the donor organ. In some embodiments, the perfusate may be cooled to a refrigeration temperature (i.e., 8-12 °C).

The filter can filter one or more contaminants from the perfusate. The perfusate is designed to pick up contaminants from the donor organ as it is perfused through the donor organ, and the filter can remove these contaminants from the perfusate. By filtering the contaminants from the perfusate, the perfusate can recirculate back through the donor organ on a recirculation loop and flush out more contaminants. For example, a leukocyte filter can remove leukocytes from the perfusate after it passes through the donor organ.

The membrane deoxygenator and the cleaning device can also treat the perfusate after it passes through the donor organ such that the perfusate is suitable for perfusing through the donor organ again. Specifically, the membrane deoxygenator may be configured to remove oxygen from the perfusate. The cleaning device may be configured to remove microorganisms, bacteria, and/or viruses from the perfusate. One example of a cleaning device is an ultraviolet-C irradiation device.

In some embodiments, a preservation device may comprise a controller 216. The controller 216 may be configured to control the refrigeration unit 212, the pump 218, and the ventilator 220. The controller may also be configured to control the heater/cooler, the filter, the membrane deoxygenator, and/or the cleaning device.

In some embodiments, the controller 216 may be configured to control the temperature and time of the refrigeration unit 212. Specifically, the controller 216 may be configured to control the refrigeration unit 212 to achieve one or more refrigeration period(s) described above with respect to method 100 of FIG. 1. For example, the controller 216 may be configured to control the refrigeration unit 212 to refrigerate the donor organ for about 14-26 hours, about 16-24 hours, or about 18-22 hours. In some embodiments, the controller 216 is configured to control the refrigeration unit 212 to refrigerate the donor organ for greater than or equal to about 14, about 16, about 18, about 20, about 2, or about 24 hours. In some embodiments, the controller 216 is configured to control the refrigeration unit 212 to refrigerate the donor organ for less than or equal to about 26, about 24, about 22, about 20, about 18, or about 16 hours. In some embodiments, the controller 216 is configured to control the refrigeration unit 212 to refrigerate the donor organ at a temperature of about 8-12 °C or about 9-11 °C. In some embodiments, the controller 216 is configured to control the refrigeration unit 212 to refrigerate the donor organ at a temperature of greater than or equal to about 8, about 9, about 10, or about 11 °C. In some embodiments, the controller 216 is configured to control the refrigeration unit 212 to refrigerate the donor organ at a temperature of less than or equal to about 12, about 11, about 10, or about 9 °C.

The controller 216 may also be configured to control the pump 218 and/or the ventilator 220 to perfuse the donor organ to achieve one or more EVOP period(s) described above with respect to method 100 of FIG. 1. For example, the controller 216 may be configured to control the pump 218 and/or ventilator 220 to perfuse the donor organ for about 2-6 to about 3-5 hours. In some embodiments, the controller 216 may be configured to control the pump 218 and/or ventilator 220 to perfuse the donor organ for greater than or equal to about 2, about 3, about 4, or about 5 hours. In some embodiments, the controller 216 may be configured to control the pump 218 and/or ventilator 220 to perfuse the donor organ for less than or equal to about 6, about 5, about 4, or about 3 hours. In some embodiments, the controller 216 may be configured to control the pump 218 and/or ventilator 220 to perfuse the donor organ at a temperature of about 34-40 °C or about 36-38 °C. In some embodiments, the controller 216 may be configured to control the pump 218 and/or ventilator 220 to perfuse the donor organ at a temperature of greater than or equal to about 34, about 35, about 36, about 37, about 38, or about 39 °C. In some embodiments, the controller 216 may be configured to control the pump 218 and/or ventilator 220 to perfuse the donor organ at a temperature of less than or equal to about 40, about 39, about 38, about 37, about 36, or about 35 °C. In some embodiments, the controller 216 may be configured to control the pump 218 and/or ventilator 220 to perfuse the donor organ at a temperature of about body temperature.

In some embodiments, the controller 216 may be configured to control the pump 218 and/or ventilator 220 to perfuse the donor organ at a refrigeration temperature. For example, the controller 216 may be configured to control the pump 218 and/or ventilator 220 to perfuse the donor organ at a temperature of about 8-12 °C or about 9-11 °C. In some embodiments, the controller 216 may be configured to control the pump 218 and/or ventilator 220 to perfuse the donor organ at a temperature of greater than or equal to about 8, about 9, about 10, or about 11 °C. In some embodiments, the controller 216 may be configured to control the pump 218 and/or ventilator 220 to perfuse the donor organ at a temperature of less than or equal to about 12, about 11, about 10, or about 9 °C.

The controller 216 may also be configured to control the heater/cooler, the filter, the membrane deoxygenator, and/or the cleaning device. For example, the controller 216 may be configured to control the heater/cooler to heat or cool the perfusate to a specific temperature. In some embodiments, the controller 216 may be configured to control the filter to remove one or more contaminants from the perfusate at a specific time and for a specific duration. In some embodiments, the controller 216 may be configured to control the membrane deoxygenator to remove oxygen from the perfusate at a specific time and for a specific duration. In some embodiments, the controller 216 may be configured to control the cleaning device to clean the perfusate at a specific time and for a specific duration.

The controller 216 may also be configured to control the preservation device to switch between a period of refrigeration and a period of EVOP, and vice versa. For example, the controller 216 may be configured to receive a user input comprising a preservation instruction. The preservation instruction can include instructions to refrigerate and perfuse the donor organ according to the preservation methods provided (e.g., method 100 of FIG. 1). The controller 216 may be configured to control the refrigeration unit 212, the pump 218, and the ventilator 220 to preserve the donor organ in accordance with the preservation instruction. This instruction can include switching to an EVOP cycle at the conclusion of a refrigeration cycle, and switching to a refrigeration cycle at the conclusion of an EVOP cycle, until the total preservation period is achieved.

In some cases, the controller 216 may be configured to control the preservation device using individual instructions for each of the alternating refrigeration and EVOP cycles. For example, the controller 216 may be configured to receive a user input comprising a refrigeration instruction. The refrigeration instruction can include instructions to refrigerate the donor organ for a specified period of time and at a specified temperature according to the methods provided (e.g., according to method 100 of FIG. 1). The controller 216 may be configured to control the refrigeration unit 212 to refrigerate the donor organ in accordance with the refrigeration instruction. At the conclusion of the refrigeration cycle, the controller 216 may be configured to receive a user input comprising a perfusion instruction. The perfusion instruction can include instructions to perfuse the donor organ according to the methods provided (e.g., according to method 100 of FIG. 1). The controller 216 may be configured to control the pump 218 and ventilator 220 to perfuse the donor organ in accordance with the perfusion instruction. At the conclusion of the EVOP cycle, the controller 216 may be configured to receive another user input comprising a refrigeration instruction. This process can continue until the total preservation period is achieved.

EXAMPLES

Two examples are described in detail below. Example 1 describes donor lungs that were preserved using static cold storage only at 10 °C for 72 hours. In this example, ex vivo lung perfusion (EVLP) was only used to assess the health and viability of the donor lungs at the conclusion of the cold storage preservation period. Example 2 describes donor lungs that were preserved using an alternating static cold storage and EVLP method according to one embodiment described herein. Specifically, the donor lungs of Example 2 were preserved using a method of alternating static cold storage at 10 °C with EVLP for a total preservation period of 72 hours. Additionally, as depicted in FIGS. 8A-8E, a detailed metabolomics analysis was completed on tissue samples obtained from the donor lungs of Example 1 and Example 2. The methods used throughout these examples are described in the Testing Methods section that follows. Each example is described in detail below.

Example 1: Donor Lungs Stored at 72 Hours Using 10 °C. Static Cold Storage Alone Donor lungs were stored using static cold storage at 10 °C only for 72 hours and the viability of the donor lungs after the preservation period was analyzed. Porcine lungs were procured using the "Lung Procurement" method described in the Testing Methods section below and stored in a thermoelectric cooler (accuracy of ±0.5 °C) at 10 °C for a period of 72 hours. After 72 hours of storage, the lungs were placed on EVLP for functional analysis, using the Toronto Protocol. This method is described in more detail in "Ex vivo lung perfusion" provided in the Testing Methods section below.

Figure 4A:
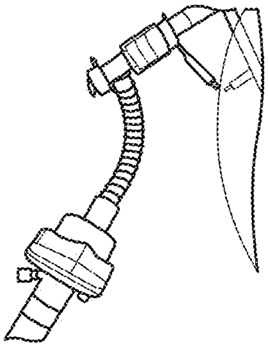
FIG. 4A shows tubing of a ventilator attached to a donor lung airway during ex vivo preservation.
Figure 4B:
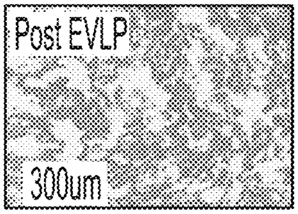
FIG. 4B shows a histology after ex vivo lung perfusion (EVLP) examination of control donor lungs (i.e., donor lungs preserved using static cold storage for 72 hours at 10 °C)
Figure 4C:
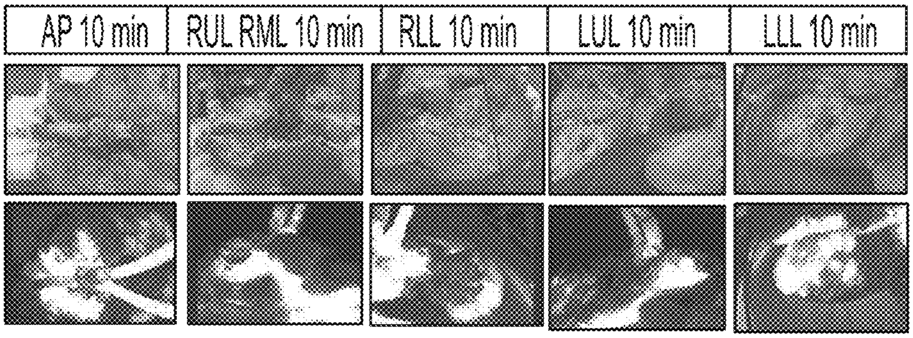
FIG. 4C shows indocyanine green images of control donor lung (i.e., donor lungs preserved using static cold storage for 72 hours at 10 °C) after EVLP examination.

When placed on the EVLP Toronto Protocol platform, the donor pig lungs developed vascular failure (depicted in FIGS. 4A-4C). EVLP was terminated after only 30 minutes due to excessive perfusate loss (>1000 mL/hr). FIG. 4A shows ventilator tubing attached to lung airway. The arrow shows perfusion solution filling the tube, which indicates severe pulmonary edema. FIG. 4B shows a representative histology after EVLP examination. Histology sections show interstitial edema, intra-alveolar edema, hemorrhage, cell infiltration and hyaline membrane formation. The representative histology was obtained using the method described in the Testing Methods section below. As shown in FIG. 4C, indocyanine green (ICG) imaging of the lungs (a marker of fluid accumulation) showed bright intensities within the lung tissue only after 10 minutes of perfusion, indicating the development of massive pulmonary edema. (ICG images were obtained using the method provided in the Testing Methods section below. As shown in FIG. 4C, "AP" is anterior-posterior, "RUL" is right upper lobe, "RML" is right middle lobe, "RLL" is right lower lobe, "LUL" is left upper lobe, and "LLL" is left lower lobe.)

Figure 4D:
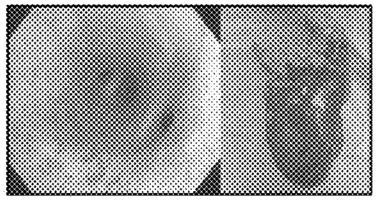
FIG. 4D shows a post-reperfusion fiberoptic bronchoscopy image and an explanted lung image of control donor lungs (i.e., donor lungs preserved using static cold storage for 72 hours at 10 °C)
Figure 4E:
FIG. 4E illustrates a histology of control donor lungs (i.e., donor lungs preserved using static cold storage for 72 hours at 10 °C) post-reperfusion.

To verify that these results were indeed indicative of poor lung quality, these results were confirmed using a syngeneic pig lung transplantation model (n=2). Similar to the previous protocol used, pig lungs were retrieved and stored using static cold storage at 10 °C for a period of 72 hours. Following the 72 hour period, the lungs were divided, and a single left lung transplant was performed using the "Lung transplantation" method provided in the Testing Methods section below. Lung function was monitored for a period of 4 hours post-transplantation. One animal died during the transplantation operation due to technical reasons. However, tissue samples from this animal were still included for further biological analysis (n=3). Similar to our EVLP assessment findings above, lungs stored at 10 °C for 72 hours developed massive edema as shown in FIG. 4D, which led to death of all animals in less than 1 hour after reperfusion. Specifically, FIG. 4D shows post-reperfusion fiberoptic bronchoscopy images alongside explanted lung images of control lungs. As shown in FIG. 4E, histology after reperfusion revealed severe interstitial edema, intra-alveolar edema, hemorrhage, cell infiltration, and hyaline membrane formation. (The histology was obtained using the method described in the Testing Methods section below.) These results reflect a severe injury phenotype, indicating that 10 °C static cold storage alone is not suitable for 3-day (i.e., 72 hour) lung preservation.

Example 2: Donor Lungs Stored for 72 Hours Using 10 °C. Static Cold Storage with Two Cycles of EVLP Preservation methods according to some embodiments described herein were evaluated. Specifically, donor pig lungs were preserved for 72 hours using an alternating static cold storage at 10 °C and EVLP technique, and the health of the donor lungs after preservation was analyzed.

Porcine lungs were procured using the "Lung Procurement" method described in the Testing Methods section below. The donor pig lungs were stored using static cold storage at 10 °C with a cyclic normothermic EVLP treatment protocol (n=4). The specific preservation method used (i.e., the time and temperature of each static cold storage and EVLP cycle) is shown in detail in FIG. 5A. Specifically, as shown in FIG. 5A, pig lungs were retrieved and stored for 6 hours at 4 °C to simulate transportation to a transplant center (i.e., in a cooler on ice), followed by 18 hours of 10 °C static cold storage. These two cooling periods are depicted as "Cold1" in the Figure. The donor lungs were then treated with a first period of normothermic EVLP for 4 hours ("EVLP1"), followed by 20 hours of 10 °C static cold storage ("Cold2"), and an additional course of 4 hours of EVLP ("EVLP2") the next day. The lungs were then stored using static cold storage at 10 °C for another 20 hours ("Cold3"). The specific EVLP method used was the Toronto protocol including an ultraviolet-C irradiation device to prevent circuit contamination during multi-day use. The Toronto protocol is described in more detail with respect to FIG. 3 and in "Ex vivo lung perfusion" provided in the Testing Methods section below.

A single left lung transplant was performed using the "Lung transplantation" method provided in the Testing Methods section below after the total 72 hour preservation period. The recipient animal was monitored post-transplant for 4 hours. At the end of the reperfusion period, the right pulmonary artery was clamped in order to assess transplanted graft oxygenation independent of the native contralateral lung.

Figure 6C:
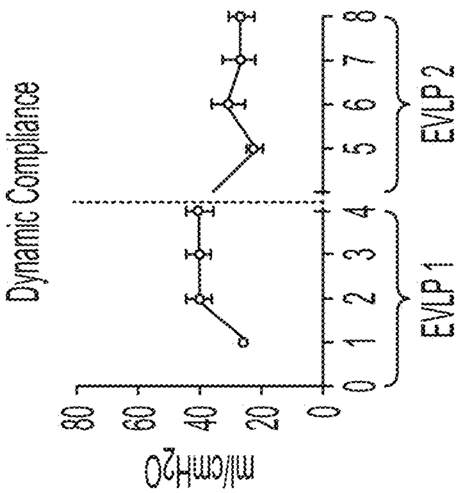
FIG. 6C shows dynamic compliance data for a first EVLP cycle and a second EVLP cycle of a donor lung preserved according to the process of FIG. 5.
Figure 6B:
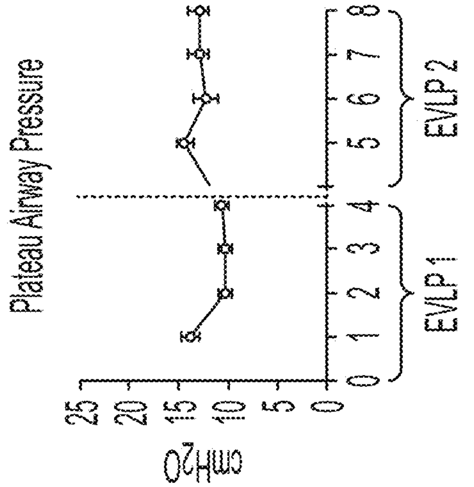
FIG. 6B shows plateau airway pressure data for a first EVLP cycle and a second EVLP cycle of a donor lung preserved according to the process of FIG. 5.
Figure 6A:
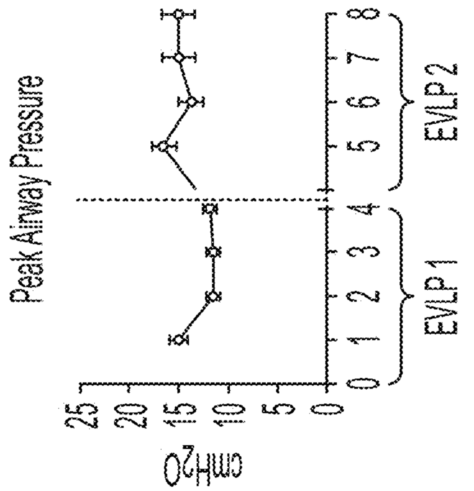
FIG. 6A provides peak airway pressure data for a first EVLP cycle and a second EVLP cycle of a donor lung preserved according to the process of FIG. 5.
Figure 6F:
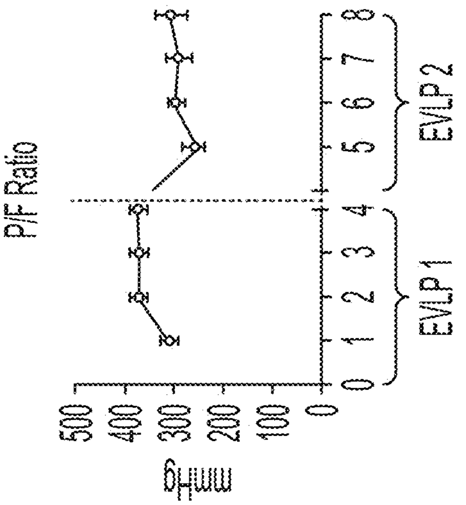
FIG. 6F shows P/F data for a first EVLP cycle and a second EVLP cycle of a donor lung preserved according to the process of FIG. 5.
Figure 6E:
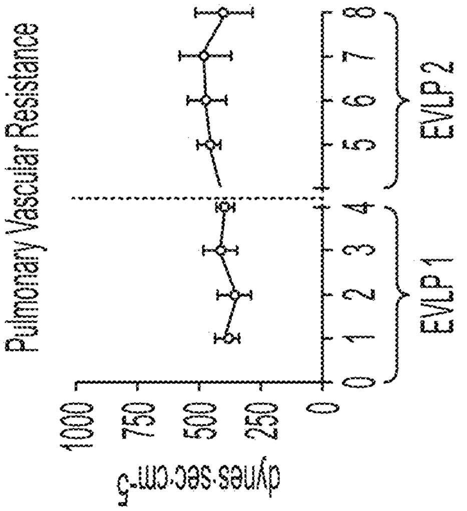
FIG. 6E shows pulmonary vascular resistance data for a first EVLP cycle and a second EVLP cycle of a donor lung preserved according to the process of FIG. 5.
Figure 6D:
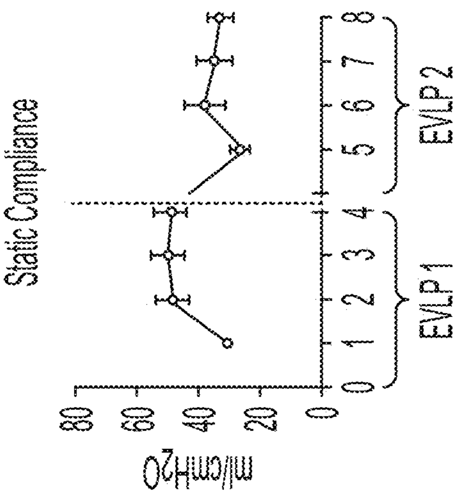
FIG. 6D shows static compliance data for a first EVLP cycle and a second EVLP cycle of a donor lung preserved according to the process of FIG. 5.
Figure 6G:
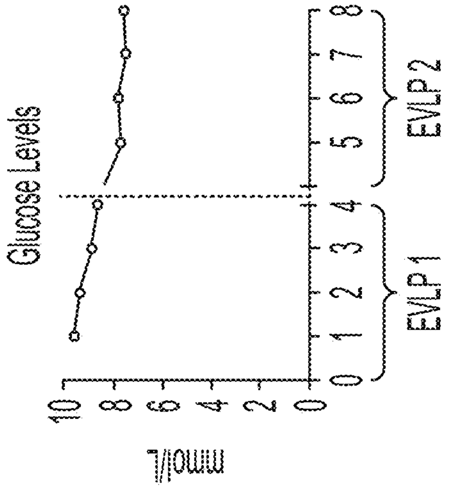
FIG. 6G shows glucose level data for a first EVLP cycle and a second EVLP cycle of a donor lung preserved according to the process of FIG. 5.
Figure 6H:
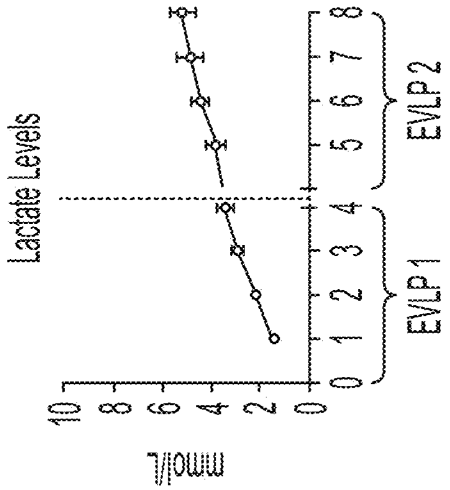
FIG. 6H shows lactate levels for a first EVLP cycle and a second EVLP cycle of a donor lung preserved according to the process of FIG. 5.
Figure 6I:
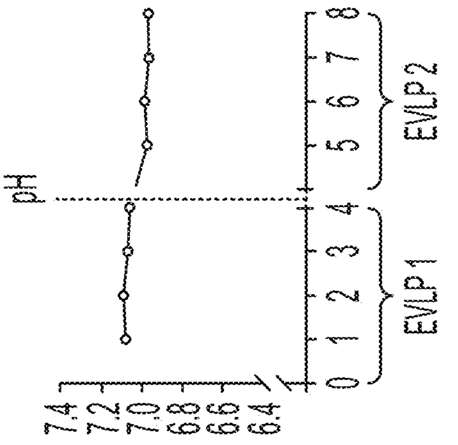
FIG. 6I shows pH data for a first EVLP cycle and a second EVLP cycle of a donor lung preserved according to the process of FIG. 5.
Figure 6J:
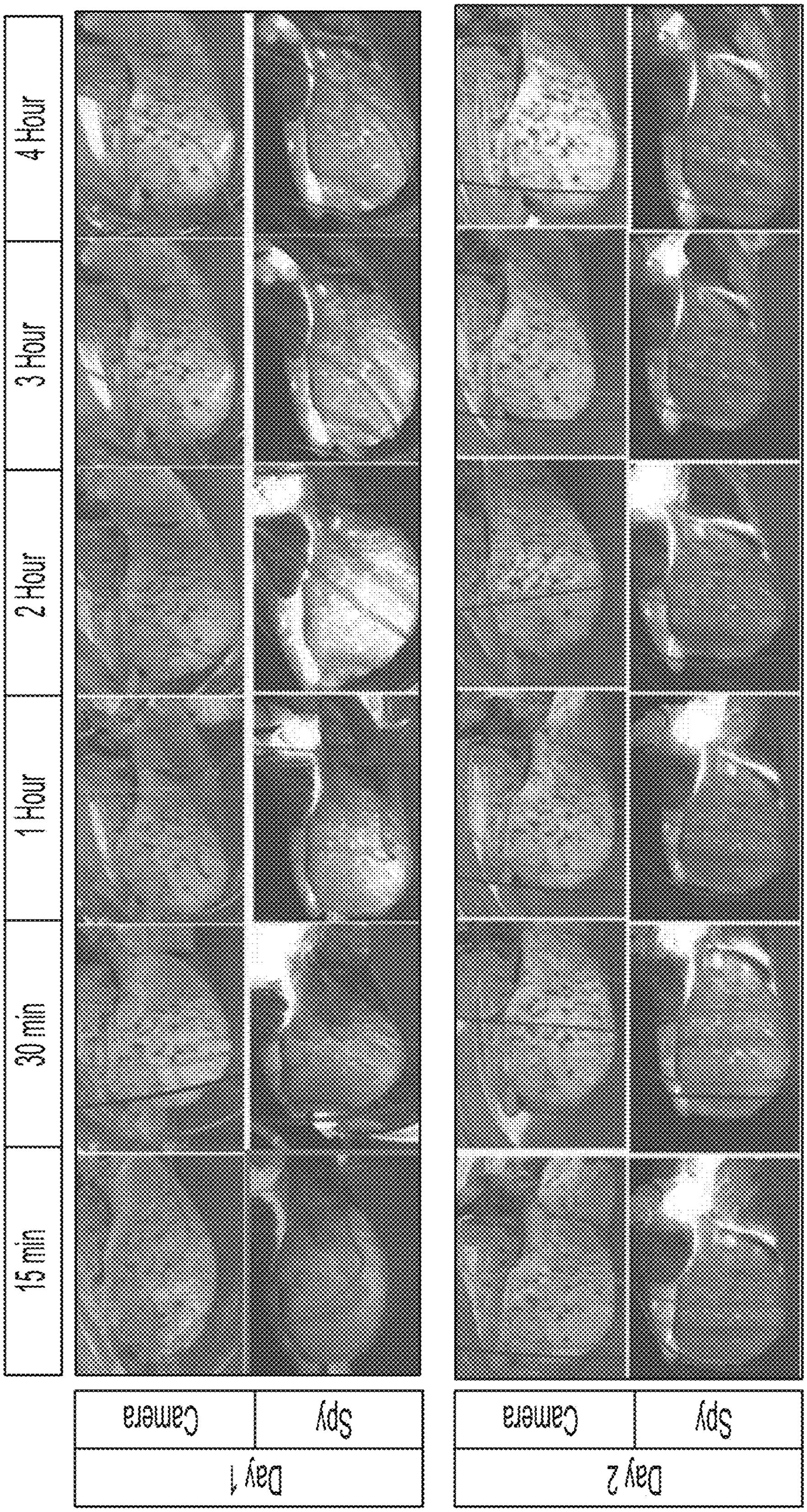
FIG. 6J shows indocyanine green images for a first EVLP cycle (i.e., Day 1) and a second EVLP cycle (i.e., Day 2) of a donor lung preserved according to the process of FIG. 5.

No differences in donor or recipient baseline characteristics were noted between lungs transplanted using the combined static cold storage and EVLP method and those used in Example 1, which were stored continuously using static cold storage at 10 °C. FIGS. 6A-6F show that lung function remained stable during both cycles of EVLP. Specifically, FIG. 6A shows an hourly assessment of peak airway pressures during both EVLP cycles, FIG. 6B shows an hourly assessment of plateau airway pressures during both EVLP cycles, FIG. 6C shows an hourly assessment of dynamic lung compliance during both EVLP cycles, FIG. 6D shows an hourly assessment of static lung compliance during both EVLP cycles, and FIG. 6E shows an hourly assessment of pulmonary vascular resistance and oxygenation during both EVLP cycles. FIG. 6F shows an hourly assessment of P/F ratio during the two EVLP cycles (i.e., ratio of oxygen partial pressure to fraction of inspired oxygen). FIGS. 6G-6I show consistent trends in biochemical profiles of the EVLP perfusate between the EVLP two cycles, indicating that the prolonged 10 °C static cold storage period between the two EVLP assessments did not promote significant metabolic stress (i.e., increased glucose consumption and lactate production rates) on the organ. Specifically, FIG. 6G shows an hourly assessment of glucose levels of the perfusate during both EVLP cycles, FIG. 6H shows an hourly assessment of lactate levels of the perfusate during both EVLP cycles, and FIG. 6I shows an hourly assessment of pH of the perfusate during both EVLP cycles. FIG. 6J shows that indocyanine green (ICG) imaging revealed stable perfusion patterns during both EVLP periods with no evidence of massive pulmonary edema formation. ("Day 1" indicates a first EVLP cycle, and "Day 2" indicates a second EVLP cycle. ICG images were obtained using the method provided in the Testing Methods section below.) All data in FIGS. 6A-6I are expressed as the mean±standard error of the mean (SEM).

Figure 5:
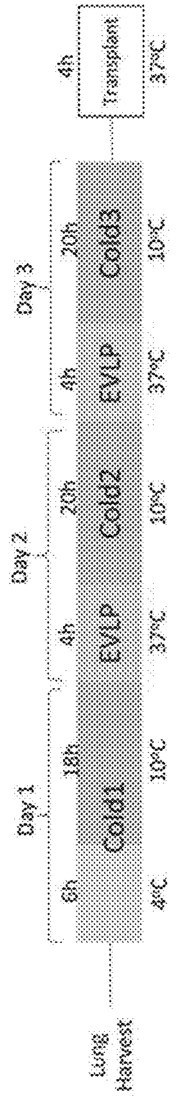
FIG. 5 shows an alternating static cold storage and EVLP process for donor lung preservation, according to some embodiments.
Figure 7A:
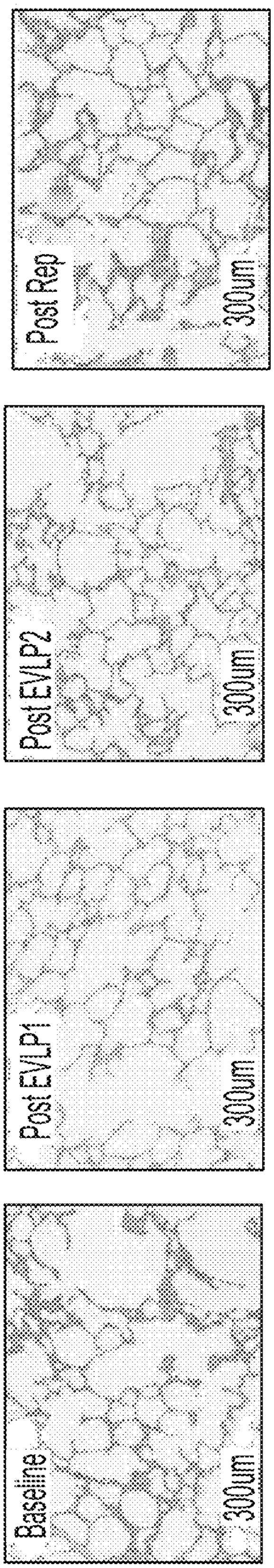
FIG. 7A illustrates the histology before preservation, after a first EVLP cycle, after a second EVLP cycle, and post-reperfusion for a donor lung preserved according to the process of FIG. 5.
Figure 7B:
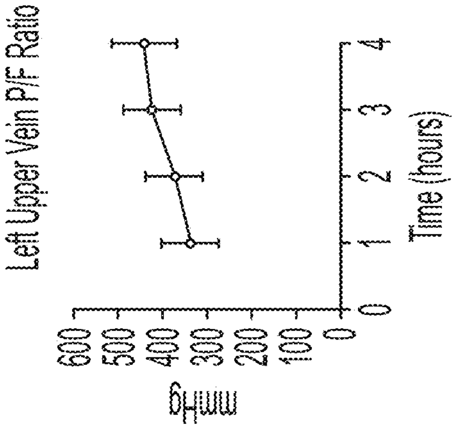
FIG. 7B shows left upper vein P/F ratio data during reperfusion for a donor lung preserved according to the process of FIG. 5.
Figure 7C:
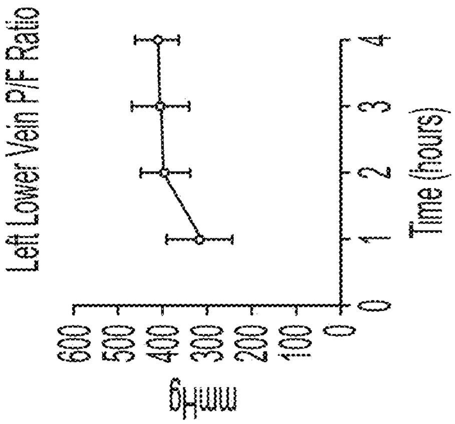
FIG. 7C shows left lower vein P/F ratio data during reperfusion for a donor lung preserved according to the process of FIG. 5.
Figure 7D:
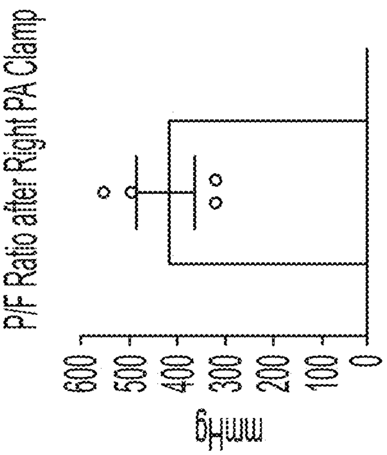
FIG. 7D shows P/F ratio data after right pulmonary artery clamping for a donor lung preserved according to the process of FIG. 5.
Figure 7E:
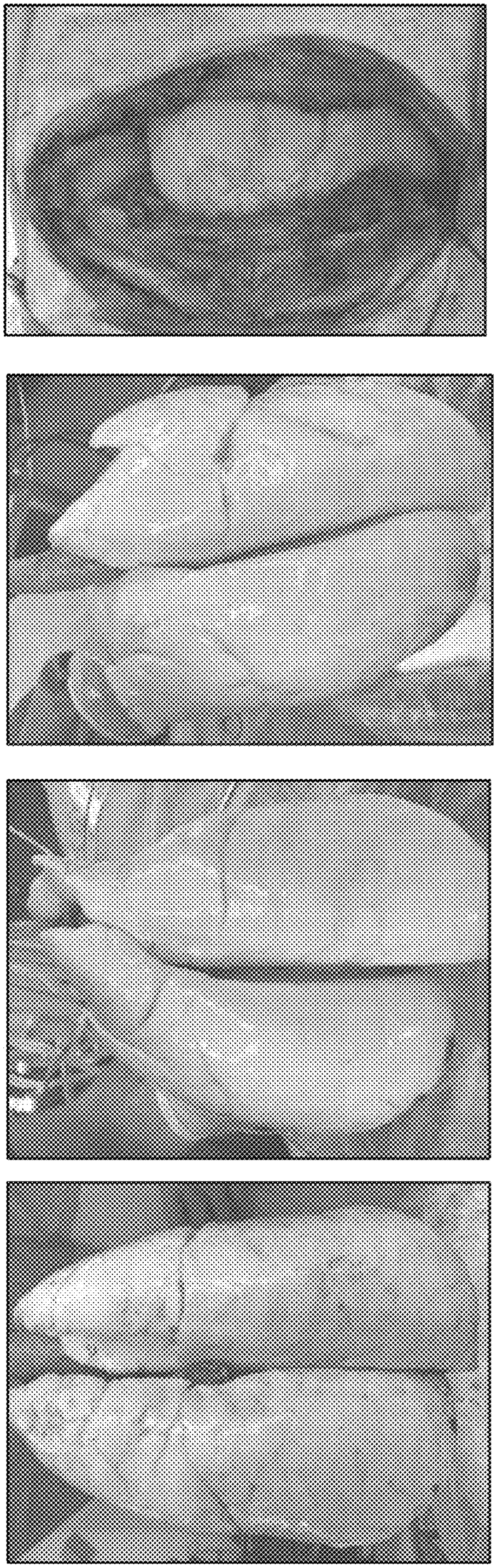
FIG. 7E shows images of lungs before preservation, after a first EVLP cycle, after a second EVLP cycle, and post-reperfusion for a donor lung preserved according to the process of FIG. 5.

At the end of the 72-hour preservation period using the combined static cold storage at 10 °C and EVLP, lung function was evaluated by performing a left single lung transplant into a syngeneic recipient animal, followed by 4 hours of lung reperfusion. This specific time period (i.e., 4 hours of lung reperfusion) is critical in assessing the onset of lung ischemia-reperfusion injury, with significance in predicting early and long-term post-transplant outcomes. Hourly functional assessments were performed to monitor post-transplant lung function, and the right pulmonary artery was clamped to measure transplanted graft oxygenation independent of the contralateral native lung at the end of reperfusion. Histological lung structures were maintained during the entire preservation period and at the end of the perfusion period, as shown in FIG. 7A. Specifically, FIG. 7A shows representative histology before lung preservation, after EVLP1, after EVLP2, and post-reperfusion. The representative histology was obtained using the method described in the Testing Methods section below. Lungs preserved for 72 hours using 10 °C static cold storage with the intermittent EVLP protocol (as depicted in FIG. 5) had excellent post-transplant graft function and no pulmonary edema was observed in the bronchoscopic assessment after transplant. Lung function was stable during the 4 hours of reperfusion based on sampling the transplanted upper and lower pulmonary veins (depicted in FIGS. 7B and 7C). Specifically, FIG. 7B shows recipient P/F ratio (i.e., ratio of oxygen partial pressure to fraction of inspired oxygen) of the left upper vein taken during 4 hours of reperfusion (data expressed as mean±SEM) and FIG. 7C shows recipient P/F ratio (i.e., ratio of oxygen partial pressure to fraction of inspired oxygen) of the left lower vein after contralateral (native lung) pulmonary artery clamping (data expressed as mean±SEM). FIG. 7D shows the systemic $PaO_2/FiO_2$ after excluding the contra-lateral lung was 422±61 mmHg. For reference, oxygenations above 300 mmHg are typically considered excellent. FIG. 7E shows representative images of lung gross appearance during the preservation period and post-transplantation. No visible signs of edema can be seen in the representative images.

Figure 8A:
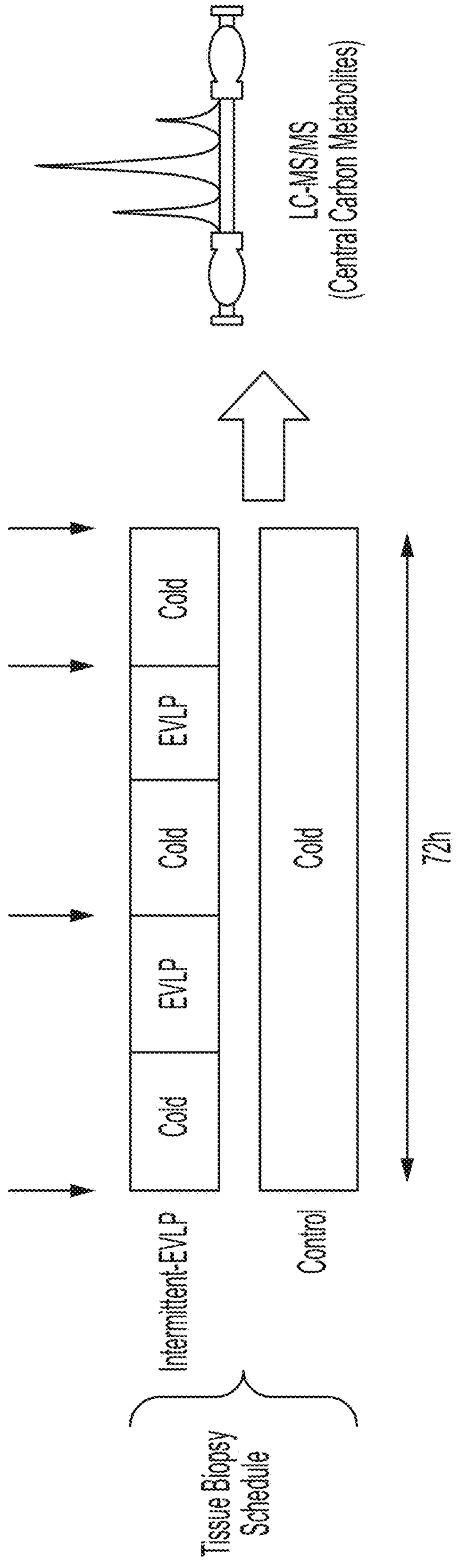
FIG. 8A shows a tissue biopsy schedule for donor lungs stored using the process of FIG. 5 and for donor lungs stored using only static cold storage (the control)
Figure 8B:
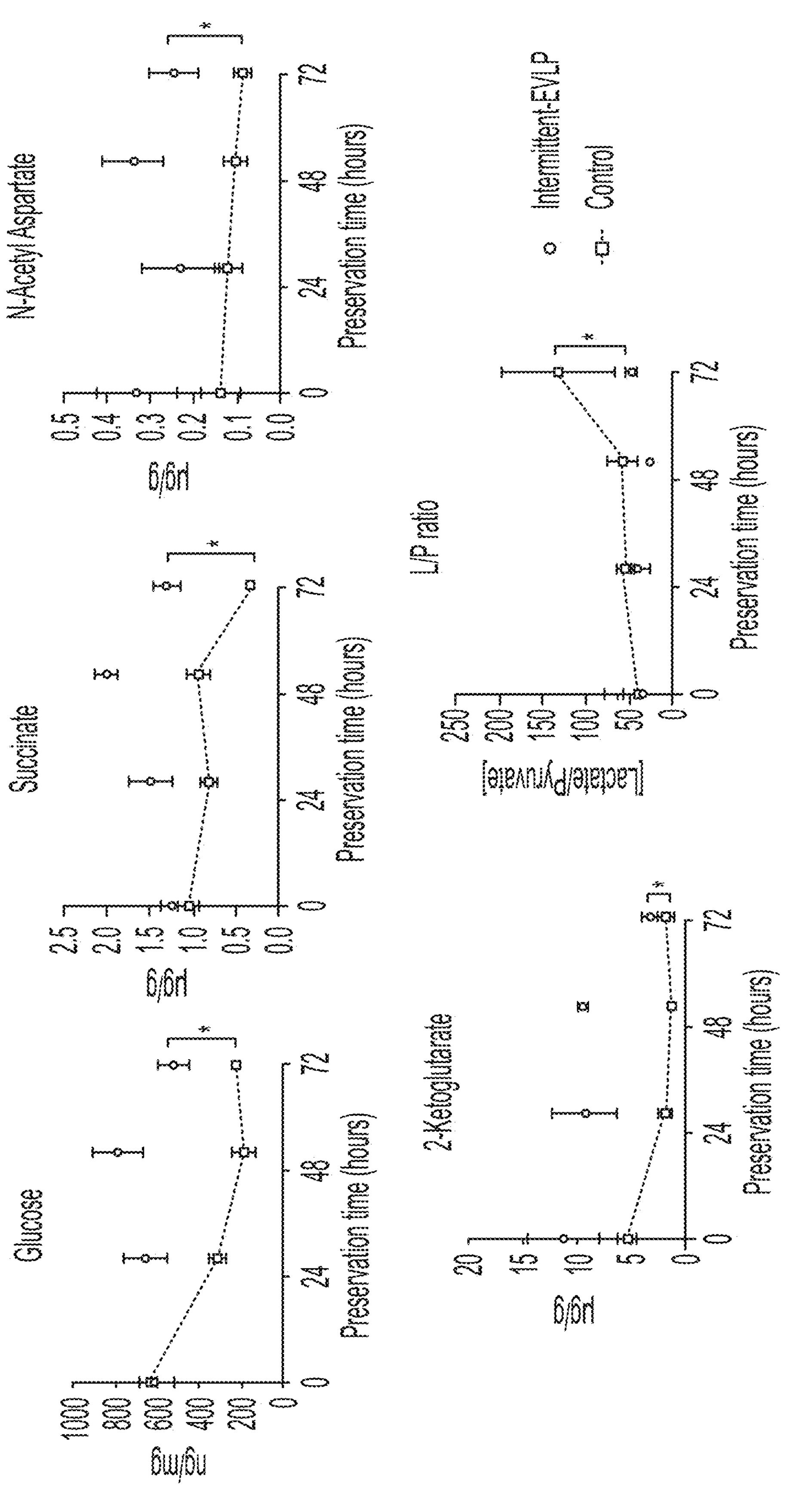
FIG. 8B shows levels of 2-ketoglutarate, Succinate, N-Acetyl aspartate, glucose, and lactate/pyruvate concentration (L/P ratio) throughout the preservation periods depicted in FIG. 8A.

In order to further characterize the metabolic restoration features of EVLP, a targeted metabolomic analysis was performed on lung tissue collected during 72-hour preservation experiments (Metabolon, Durham, N.C.). The procedure used is described in detail in "Metabolomic Analysis" provided in the Testing Methods section below. The full biopsy schedule is shown in FIG. 8A, where each arrow indicates when during the preservation procedure tissue samples were collected. Specifically, tissue samples (n=4) were collected at 0 h, 28 h, 52 h, and 72 h for lungs undergoing the combined static cold storage and EVLP methods according to embodiments described herein. Tissue samples were also taken from donor lungs continuously stored at 10 °C (n=3) and tested. The tissue was then subjected to targeted quantitative analyses using Liquid Chromatography with tandem mass spectrometry (LC-MS-MS).

Since cells may potentially utilize varying energy sources during preservation, a panel of key metabolites involved in central carbon metabolism were selected for analysis in order to gain a holistic overview of the most important energy-relevant pathways. Results showed significantly greater maintenance of tissue glucose (FIG. 8B, p=<0.0001), succinate (FIG. 8B, p=<0.0001), N-acetyl Aspartate (FIG. 8B, p=0.0019), and 2-Ketoglutarate (FIG. 8B, p=0.0004) in lungs subjected to a combined static cold storage at 10 °C and EVLP protocol versus lungs which were stored continuously using only static cold storage at 10 °C (i.e., the control). Furthermore, the changes in lactate/pyruvate tissue levels was calculated to evaluate potential aerobic to anaerobic metabolic shifts during the preservation period. The ratio of lactate/pyruvate concentration was quantified and expressed as L/P ratio. (High levels of lactate/pyruvate ratio have been previously shown to be a potential marker of poor graft quality.) Results showed maintenance of lactate/pyruvate ratios in lungs undergoing the intermittent EVLP protocol, while this ratio became significantly elevated during continuous cold storage (FIG. 5E, p=0.0405).

Testing Methods

Discussed below are the methods used in Examples 1 and/or 2 described above. Methods of lung procurement, ex vivo lung perfusion, lung transplantation, metabolomic analysis, lung histology, indocyanine green (ICG) imaging, and statistical analysis are each described in detail below.

Lung procurement: One hundred and twenty donor Yorkshire pigs (29-35 kg) were sedated with ketamine (20 mg/kg IM), midazolam (0.3 mg/kg IM), and atropine (0.04 mg/kg IM), and then anesthetized with inhaled isoflurane (1-3%), followed by a continuous intravenous injection of propofol (3-4 mg/kg/h) and remifentanil (9-30 ug/kg/hr). The animals were placed in supine position, intubated and subsequently pressure-control ventilated at an inspired oxygen fraction (FIO2) of 0.5, a frequency of 15 breaths/min, a positive end-expiratory pressure (PEEP) of 5 $cmH_2O$, and a controlled pressure above PEEP of 15 $cmH_2O$. After a median sternotomy, the main pulmonary artery was cannulated, the superior and inferior vena cava was tied, the aorta was clamped, and the left atrial appendage was incised. A 2L anterograde flush was performed in the donor at a height of 30 cm above the heart. A ventilator inspiratory hold was performed, the trachea was clamped, and the lungs were excised and placed on the back-table. Once on the back-stable, an additional 1L retrograde flush was performed. The lungs were placed in an organ bag and kept at 4 °C.

Ex vivo lung perfusion (EVLP): EVLP was performed according to the Toronto protocol involving an acellular perfusate, a closed left atrium, protective flows, and protective ventilation. The lung bloc was placed in the XVIVO chamber (Vitrolife, Denver, CO). The trachea was intubated and connected to the ventilator. The pulmonary artery (PA) and left atrium (LA) were cannulated, and the LA and PA were directly connected to the perfusion circuit. The EVLP perfusate consisted of 1.5 L of an extracellular albumin solution (STEEN™). The perfusate was driven by a centrifugal pump at a constant flow rate. The temperature of the perfusate was gradually increased to 37 °C. When the temperature of the perfusate reached 32 °C, volume-control ventilation (VCV) was initiated. The perfusate flow rate was gradually increased to the full flow rate of 40% estimated cardiac output (CO=100 ml/kg). EVLP was performed for 4 hours, in which physiologic assessments were taken hourly. These included ventilator parameters (dynamic compliance, static compliance, peak airway pressure, plateau pressure) and perfusate blood gas analysis. Lungs were weighed prior to and after EVLP (Model CS 2000, OHAUS Corporation, USA). The net weight gain was calculated and used to as a measure of lung edema. After the first EVLP, the EVLP circuit was stored in a walk-in cooler at 4 °C overnight and re-connected to the lung for the next EVLP cycle using snap-cannulas. An ultra-violet C device was added to the circuit and run continuously during the perfusion periods in order to prevent potential microbial contamination.

Lung transplantation: To begin the transplant procedure, a left thoracotomy was performed through the fifth intercostal space. The pulmonary hilum was dissected, and the left azygous vein was carefully elevated from the left atrium and ligated. The inferior pulmonary ligament was divided. Both the right and left main pulmonary arteries were carefully dissected. After administration of heparin, a left pneumonectomy was completed.

The bronchial anastomosis was performed first with a continuous 4-0 synthetic, monofilament, nonabsorbable polypropylene suture interrupted in two places. The PA anastomosis was performed next with a continuous 5-0 PROLENE suture interrupted in two places. Lastly, the left atrial anastomosis was performed with a continuous 5-0 PROLENE suture interrupted in two places. After that, the transplanted lung was re-inflated to a volume of 10 ml/kg of mean donor/recipient weight. The lungs were de-aired through the left atrial anastomosis. Hourly ventilator assessments (peak airway pressure, plateau pressure, dynamic compliance, static) and blood gases at an $FiO_2$ of 100% from the left upper vein and lower vein were taken. The right pulmonary artery was clamped 4 hours after reperfusion in order to assess functions of the transplanted lung only and a systemic arterial blood gas sample was taken.

Metabolomic Analysis: Tissue samples (Pre-preservation, Post-preservation, End of EVLP) were snap-frozen and stored at −80 °C and assayed for untargeted measurements of metabolites (Metabolon Inc., Durham, N.C.). Samples were extracted and prepared using Metabolon's standard solvent extraction method just prior to profiling analysis using Gas Chromatography (GC)-MS and Liquid Chromatography (LC)-MS/MS platforms. Data extraction, peak identification and compound identification were provided by Metabolon. Metabolomics data analysis of raw peak intensities was performed using MetaboAnalyst software. Data was processed by imputing missing or zero values with half of the minimum value, and metabolites with more than 50% missing values were deleted from further analysis. Subsequently data was normalized (quantile), log 2 transformed and auto scaled. Principal Component Analysis (PCA), hierarchical clustering and statistical tests were performed on normalized data. For two group comparisons we used a t-test. For analysis of quantitative analysis which involved a time component, two-way ANOVA was used. Statistical significance was considered for features with a False Discovery Rate (FDR) corrected p-value<0.05. For targeted analysis, tissue samples (0 h, 28 h, 52 h, and 72 h) were taken and snap-frozen during 3-day preservation studies. Samples were stored at −80 °C and sent to Metabolon for analysis of a single-carbon metabolism panel (Pyruvic Acid, Lactic Acid,2-Ketoglutaric Acid, Succinic Acid, Fumaric Acid, Malic Acid, N-Acetyl aspartic Acid) as well as glucose using LC-MS/MS.

Lung Histology: Lung Tissue was collected at the beginning of the preservation period, after EVLP1, after EVLP2, and at the end of the reperfusion period. Lung tissue samples were embedded in paraffin after fixation in 10% buffered formalin for 24 h, followed by 5 μm thick sectioning. Lung tissue samples were then stained to determine the degree of lung injury using standard Hematoxylin and Eosin (H&E) staining.

Indocyanine green (ICG) imaging: Near-infrared (NIR) fluorescent imaging with indocyanine green (ICG) has been used in various clinical intraoperative applications to evaluate tissue perfusion and can be used to non-invasively monitor and quantify lung microvascular perfusion and vascular permeability. In order to visualize tissue perfusion during EVLP, a single ICG (0.6 mg) dose was added to the EVLP perfusate and serial NIR imaging was performed with SPY Elite imaging system (Stryker, Kalamazoo, MI, USA) during perfusion. Since the EVLP does not contain a liver (which is responsible for metabolizing ICG), image signal could be maintained without re-dosing the circuit.

Statistical Analysis: All results from are expressed as mean±standard error of the mean (SEM). Mann-Whitney tests were performed to compare difference between groups. For data involving a time-component, two-way analysis of variance for repeated measures was used, followed by a Bonferroni correction for multiple comparisons. Graph Pad Prism Version 7 (GraphPad Software, La Jolla, CA) computer software was used to conduct all statistical analyses.

The foregoing description sets forth exemplary systems, methods, techniques, parameters, and the like. It should be recognized, however, that such description is not intended as a limitation on the scope of the present disclosure but is instead provided as a description of exemplary embodiments.

In some embodiments, any one or more of the features, characteristics, or elements discussed above with respect to any of the embodiments may be incorporated into any of the other embodiments mentioned above or described elsewhere herein.

Although the description herein uses terms first, second, etc. to describe various elements, these elements should not be limited by the terms. These terms are only used to distinguish one element from another.

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±0.05%, ±0.1%, ±0.2%, ±0.3%, ±0.4%, ±0.5%, ±1%, ±2%, ±3%, ±4%, ±5%, ±6%, ±7%, ±8%, ±9%, ±10% or more. All numeric values are modified by the term "about" whether or not explicitly indicated. Numeric values modified by the term "about" include the specific identified value. For example "about 5.0" includes 5.0.

For any of the structural and functional characteristics described herein, methods of determining these characteristics are known in the art.

The invention claimed is:

1. A method of preserving a donor organ for transplantation, the method comprising:

transporting, in a transportation unit, a donor organ at 8-12 °C from a donor site to a perfusion site different from the donor site prior to any perfusion of the donor organ to form a once-cooled donor organ;

perfusing, at the perfusion site, the once-cooled donor organ to form a once-perfused donor organ; and transporting, in the transportation unit, the once-perfused donor organ at 8-12 °C from the perfusion site to a transplantation site different from the perfusion site to form a preserved, twice-cooled donor organ for transplantation, wherein the transportation unit maintains the donor organ at 8-12 °C via static cold storage.

2. The method of claim 1, comprising perfusing the twice-cooled donor organ to form a preserved, twice-perfused donor organ for transplantation.

3. The method of claim 2, comprising refrigerating the twice-perfused donor organ to form a thrice-cooled donor organ for transplantation.

4. The method of claim 1, wherein perfusing comprises ventilating the donor organ.

5. The method of claim 1, wherein perfusing comprises normothermic perfusion.

6. The method of claim 1, wherein perfusing comprises perfusing for less than 6 hours.

7. The method of claim 1, wherein at least one of the transportation steps comprises maintaining the donor organ at 8-12 °C via static cold storage for less than 24 hours.

8. The method of claim 1, wherein perfusing comprises pumping perfusate through the donor organ and wherein the perfusate is 8-12 °C.

9. The method of claim 1, wherein perfusing comprises pumping perfusate through the donor organ and wherein the perfusate is 34-40 °C.

10. The method of claim 1, wherein the method is performed over a total time period of at least 48 hours.

11. The method of claim 1, wherein the donor organ is a lung.

12. The method of claim 1, wherein maintaining the donor organ at 8-12 °C comprises maintaining the donor organ at 8-12 °C for at least 12 hours.

13. A method of preserving a donor organ for transplantation, the method comprising:

placing the donor organ into a preservation device comprising a refrigeration unit and a perfusion unit;

statically refrigerating, by the refrigeration unit, a donor organ at 8-12 °C prior to any perfusion of the donor organ to form a once-refrigerated donor organ;

perfusing, by the perfusion unit, the once-refrigerated donor organ to form a once-perfused donor organ; and statically refrigerating, by the refrigeration unit, the once-perfused donor organ to form a preserved, twice-refrigerated donor organ for transplantation.

14. The method of claim 1, wherein the donor site is the transplantation site.

15. The method of claim 1, wherein the transplantation site is different from the donor site.

16. The method of claim 13, wherein the preservation device is transportable.

17. The method of claim 13, wherein at least one of statically refrigerating the donor organ at 8-12 °C prior to any perfusion of the donor organ to form a once-refrigerated donor organ, perfusing the once-refrigerated donor organ to form a once-perfused donor organ, statically refrigerating, by the refrigeration unit, the once-perfused donor organ to form a preserved, twice-refrigerated donor organ for transplantation is performed during transportation of an organ from a donor site to a transplant site.

18. The method of claim 13, wherein the donor organ does not need to be physically transferred between the perfusion unit and the refrigeration unit.

19. The method of claim 13, wherein perfusing comprises ventilating the donor organ.

20. The method of claim 13, wherein perfusing comprises normothermic perfusion.

21. The method of claim 1, comprising:

removing the once-cooled donor organ from the transportation unit prior to perfusion; and returning the once-perfused donor organ to the transportation unit after perfusion.

* * * * *